(12) United States Patent
Gallant et al.

(10) Patent No.: US 11,453,948 B2
(45) Date of Patent: Sep. 27, 2022

(54) ARTIFICIAL SOLID ELECTROLYTE INTERPHASE LAYERS

(71) Applicant: Massachusetts Institute of Technology, Cambridge, MA (US)

(72) Inventors: Betar Gallant, Cambridge, MA (US); Mingfu He, Quincy, MA (US); Rui Guo, Shanghai (CN)

(73) Assignee: Massachusetts Institute of Technology, Cambridge, MA (US)

( * ) Notice: Subject to any disclaimer, the term of this patent is extended or adjusted under 35 U.S.C. 154(b) by 8 days.

(21) Appl. No.: 16/538,711

(22) Filed: Aug. 12, 2019

(65) Prior Publication Data

US 2020/0071835 A1    Mar. 5, 2020

Related U.S. Application Data

(60) Provisional application No. 62/724,451, filed on Aug. 29, 2018.

(51) Int. Cl.

| | | |
|---|---|---|
| *H01M 10/0562* | (2010.01) | |
| *H01M 10/0525* | (2010.01) | |
| *C23C 22/73* | (2006.01) | |
| *C23C 22/78* | (2006.01) | |

(52) U.S. Cl.
CPC .............. *C23C 22/73* (2013.01); *C23C 22/78* (2013.01); *H01M 10/0525* (2013.01); *H01M 10/0562* (2013.01); *H01M 2300/008* (2013.01); *H01M 2300/0071* (2013.01)

(58) Field of Classification Search
CPC ........ H01M 4/24; H01M 4/242; H01M 4/381; H01M 4/405; H01M 4/382; H01M 4/131; H01M 4/134; H01M 4/1391; H01M 4/1395; H01M 10/0525; H01M 10/0562; H01M 2300/007; H01M 2300/008
See application file for complete search history.

(56) References Cited

U.S. PATENT DOCUMENTS

| | | | |
|---|---|---|---|
| 8,535,834 B1 * | 9/2013 | Yoon ................. | H01M 10/0568 429/322 |
| 2009/0280410 A1 * | 11/2009 | Zaguib .................... | C23C 28/34 429/220 |
| 2017/0288281 A1 * | 10/2017 | Chiang ............... | H01M 4/5825 |
| 2019/0348672 A1 * | 11/2019 | Wang ................. | H01M 4/5815 |

FOREIGN PATENT DOCUMENTS

| | | | | |
|---|---|---|---|---|
| CN | 107749492 A | * | 3/2018 | |
| WO | WO-2016094551 A | * | 6/2016 | .......... H01M 4/9083 |

OTHER PUBLICATIONS

Andersson et al., Electrochemically lithiated graphite characterised by photoelectron spectroscopy. J Power Sources. 2003;119, 522-527. doi:10.1016/S0378-7753(03)00277-5.

(Continued)

*Primary Examiner* — Maria Laios
*Assistant Examiner* — Bartholomew A Hornsby
(74) *Attorney, Agent, or Firm* — Wolf, Greenfield & Sacks, P.C.

(57) ABSTRACT

Articles and methods related to passivation layers on alkali metals are generally described.

11 Claims, 26 Drawing Sheets

(56) References Cited

OTHER PUBLICATIONS

Aurbach et al., Recent Studies of the Lithium Liquid Electrolyte Interface—Electrochemical, Morphological and Spectral Studies of a Few Important Systems. J Power Sources. 1995;54, 76-84, doi:Doi 10.1016/0378-7753(94)02044-4.

Aurbach et al., Recent studies on the correlation between surface chemistry, morphology, three-dimensional structures and performance of Li and Li—C intercalation anodes in several important electrolyte systems. J Power Sources. 1997;68, 91-98, doi:Doi 10.1016/S0378-7753(97)02575-5.

Aurbach et al., The Study of Electrolyte-Solutions Based on Ethylene and Diethyl Carbonates for Rechargeable Li Batteries .1. Li Metal Anodes. J Electrochem Soc 142, 2873-2882, doi:Doi 10.1149/1.2048658 (1995).

Aurbach et al., Identification of Surface-Films Formed on Lithium in Propylene Carbonate Solutions. J Electrochem Soc 134, 1611-1620, doi:Doi 10.1149/1.2100722 (1987).

Aurbach et al., The Surface-Chemistry of Lithium Electrodes in Alkyl Carbonate Solutions. J Electrochem Soc 141, L1-L3, doi:Doi 10.1149/1.2054718 (1994).

Bates et al., Fabrication and Characterization of Amorphous Lithium Electrolyte Thin-Films and Rechargeable Thin-Film Batteries. J Power Sources 43, 103-110, doi:Doi 10.1016/0378-7753(93)80106-Y (1993).

Cheng et al., A Review of Solid Electrolyte Interphases on Lithium Metal Anode. Adv Sci 3, doi:UNSP 1500213 10.1002/advs.201500213 (2016).

Choudhury et al., A highly reversible room-temperature lithium metal battery based on crosslinked hairy nanoparticles. Nat Commun 6, doi:ARTN 10101 10.1038/ncomms10101 (2015).

Fong et al., Studies of Lithium Intercalation into Carbons Using Nonaqueous Electrochemical-Cells. J Electrochem Soc 137, 2009-2013, doi:Doi 10.1149/1.2086855 (1990).

Gauthier et al., Electrode-Electrolyte Interface in Li-Ion Batteries: Current Understanding and New Insights. J Phys Chem Lett 6, 4653-4672, doi:10.1021/acs.jpclett.5b01727 (2015).

Harry et al., Detection of subsurface structures underneath dendrites formed on cycled lithium metal electrodes. Nat Mater 13, 69-73, doi:10.1038/Nmat3793 (2014).

Kanamura et al., Xps Analysis of a Lithium Surface Immersed in Propylene Carbonate Solution Containing Various Salts. J Electroanal Chem 333, 127-142, doi:Doi 10.1016/0022-0728(92)80386-I (1992).

Kanamura et al., Xps Analysis for the Lithium Surface Immersed in Gamma-Butyrolactone Containing Various Salts. Electrochim Acta 40, 913-921, doi:Doi 10.1016/0013-4686(93)E0020-M (1995).

Kanamura et al., Morphology and Chemical-Compositions of Surface-Films of Lithium Deposited on a Ni Substrate in Nonaqueous Electrolytes. J Electroanal Chem 394, 49-62, doi:Doi 10.1016/0022-0728(95)03972-J (1995).

Kanamura et al., Xps Analysis for the Lithium Surface Immersed in Tetrahydrofuran Containing Various Salts. Denki Kagaku 61, 1377-1382 (1993).

Kanamura et al., Xps Analysis of Lithium Surfaces Following Immersion in Various Solvents Containing Libf4. J Electrochem Soc 142, 340-347, doi:Doi 10.1149/1.2044000 (1995).

Kanno et al., Lithium ionic conductor thio-LISICON—The Li2S—GeS2—P2S5 system. J Electrochem Soc 148, A742-A746, doi:10.1149/1.1379028 (2001).

Khurana et al., Suppression of Lithium Dendrite Growth Using Cross-Linked Polyethylene/Poly(ethylene oxide) Electrolytes: A New Approach for Practical Lithium-Metal Polymer Batteries. J Am Chem Soc 136, 7395-7402, doi:10.1021/ja502133j (2014).

Li et al., Revealing Nanoscale Passivation and Corrosion Mechanisms of Reactive Battery Materials in Gas Environments. Nano Lett 17, 5171-5178, doi:10.1021/acs.nanolett.7b02630 (2017).

Lin et al., Reviving the lithium metal anode for high-energy batteries. Nat Nanotechnol 12, 194-206, doi:10.1038/Nnano.2017.16 (2017).

Momma et al., Effect of the atmosphere on chemical composition and electrochemical properties of solid electrolyte interface on electrodeposited Li metal. J Power Sources 196, 6483-6487, doi:10.1016/j.jpowsour.2011.03.095 (2011).

Monroe et al., The impact of elastic deformation on deposition kinetics at lithium/polymer interfaces. J Electrochem Soc 152, A396-A404, doi:10.1149/1.1850854 (2005).

Nazri et al., Composition of Surface-Layers on Li Electrodes in Pc, Liclo4 of Very Low Water-Content. J Electrochem Soc 132, 2050-2054, doi:Doi 10.1149/1.2114288 (1985).

Peled et al., The role of SEI in lithium and lithium ion batteries. Mater Res Soc Symp p. 393, 209-221 (1995).

Peled, The Electrochemical-Behavior of Alkali and Alkaline-Earth Metals in Non-Aqueous Battery Systems—the Solid Electrolyte Interphase Model. J Electrochem Soc 126, 2047-2051, doi:Doi 10.1149/1.2128859 (1979).

Peled et al., Advanced model for solid electrolyte interphase electrodes in liquid and polymer electrolytes. J Electrochem Soc 144, L208-L210, doi:Doi 10.1149/1.1837858 (1997).

Tikekar et al., Design principles for electrolytes and interfaces for stable lithium-metal batteries. Nat Energy 1, 1-7, doi:Artn 16114 10.1038/Nenergy.2016.114 (2016).

Wu et al., Electrochemical behaviors of a Li3N modified Li metal electrode in secondary lithium batteries. J Power Sources 196, 8091-8097, doi:10.1016/j.jpowsour.2011.05.035 (2011).

Yan et al. Ultrathin Two-Dimensional Atomic Crystals as Stable Interfacial Layer for Improvement of Lithium Metal Anode. Nano Lett 14, 6016-6022, doi:10.1021/nl503125u (2014).

Zheng et al. Interconnected hollow carbon nanospheres for stable lithium metal anodes. Nat Nanotechnol. 2014;9, 618-623, doi:10.1038/Nnano.2014.152.

Choudhury et al., Lithium Fluoride Additives for Stable Cycling of Lithium Batteries at High Current Densities. Adv Electron Mater 2, doi:ARTN 150024610.1002/aelm.201500246 (2016).

Lin et al., Conformal Lithium Fluoride Protection Layer on Three-Dimensional Lithium by Nonhazardous Gaseous Reagent Freon. Nano Lett. Jun. 14, 2017;17(6):3731-3737. doi: 10.1021/acs.nanolett.7b01020. Epub May 25, 2017. PMID: 28535068.

Lu et al., Stable lithium electrodeposition in liquid and nanoporous solid electrolytes. Nat Mater 13, 961-969, doi:10.1038/Nmat4041 (2014).

Markevich et al., Very Stable Lithium Metal Stripping-Plating at a High Rate and High Areal Capacity in Fluoroethylene Carbonate-Based Organic Electrolyte Solution. Acs Energy Lett 2, 1321-1326, doi:10.1021/acsenergylett.7b00300 (2017).

Qian et al. High rate and stable cycling of lithium metal anode. Nat Commun 6, doi:ARTN 636210.1038/ncomms7362 (2015).

* cited by examiner

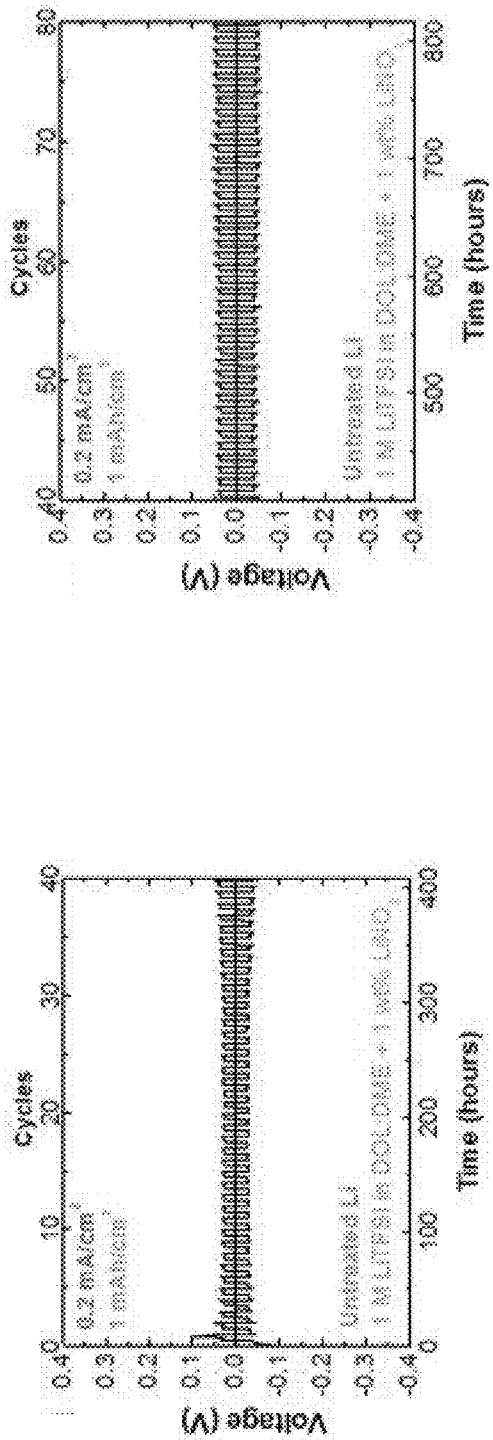
FIG. 11A
FIG. 11B
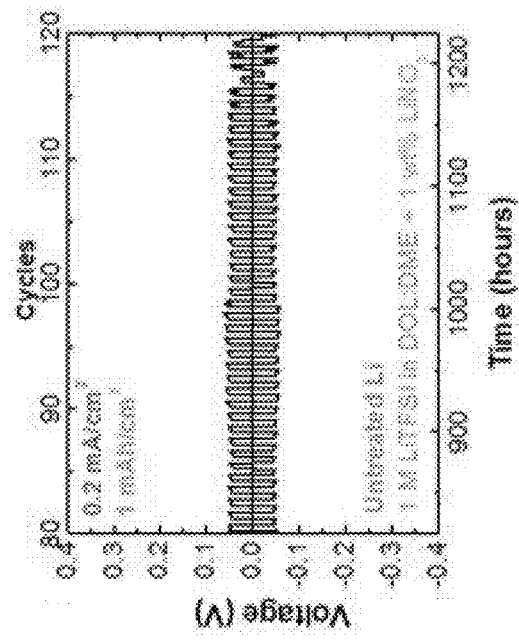
FIG. 11C

ARTIFICIAL SOLID ELECTROLYTE INTERPHASE LAYERS

RELATED APPLICATIONS

This application claims priority under 35 USC 119(e) to U.S. Provisional Application No. 62/724,451, filed Aug. 29, 2018, and entitled "DESIGN OF INORGANIC LAYERS FOR ARTIFICIAL INTERPHASES ON ALKALI METALS USING REACTIVE GASES," which is incorporated herein by reference in its entirety for all purposes.

TECHNICAL FIELD

Articles and methods related to passivation layers on alkali metals are generally described.

BACKGROUND

Rechargeable batteries play a central role in energy storage technologies for portable power and consumer electronics, but their energy densities need to be increased to be viable for implementation in mass-market devices, such as electric vehicles or electrical power grids for the storage of renewable energy. The ability to form a stable solid electrolyte interphase (SEI) layer on an electrode is critical to operating an electrochemical cell at a potential below the reduction potential of the solvent used in the electrochemical cell. Conventional SEI layers are formed by immersing an electrode into an electrochemical cell containing a particular solvent and/or electrolyte, and cycling the electrochemical cell under certain operating conditions that cause reduction of the solvent and/or electrolyte and subsequent deposition of the SEI layer onto the electrode. For example, when a graphite or lithium (Li) electrode is immersed in a solution of ethylene carbonate or propylene carbonate, a SEI layer is formed on the electrode during cycling of the electrochemical cell. Li electrodes comprising SEI layers often suffer from volume expansion and contraction during cycling and are susceptible to dendrite formation due to self-plating of Li onto itself along with uneven Li growth along the surface. Solving the problems concerning SEI layers on Li electrodes is critical to realizing the promises of higher energy-density Li-ion batteries. Accordingly, improved articles and methods related to passivation layers on alkali metals would be desirable.

SUMMARY

Articles and methods related to passivation layers on alkali metals are generally described. The subject matter of the present invention involves, in some cases, interrelated products, alternative solutions to a particular problem, and/or a plurality of different uses of one or more systems and/or articles.

According to certain embodiments, an article is described, wherein the article comprises an alkali metal layer and a passivation layer comprising an alkali metal salt, wherein the molar percentage of hydrogen at the surface of the passivation layer is less than or equal to about 1 mol. %, a thickness of the passivation layer is greater than or equal to about 0.05 micrometers, and the passivation layer is in direct contact with the alkali metal layer.

In some embodiments, an article comprise an alkali metal layer and a passivation layer comprising an alkali metal salt, wherein the molar percentage of carbon, hydrogen, and/or oxygen in the passivation layer is less than 6 mol. % at a depth of about 0.01 micrometers, a thickness of the passivation layer is greater than or equal to about 0.05 micrometers, and the passivation layer is directly contacting the alkali metal layer.

In certain embodiments, an article comprises an alkali metal layer and a passivation layer comprising an alkali metal oxide, wherein the passivation layer is in direct contact with the alkali metal layer.

According to some embodiments, a method of forming a passivation layer is described, wherein the method comprises reacting a substrate comprising one or more alkali metals with a gas, and forming the passivation layer on at least a portion of the substrate, wherein the passivation layer comprises an alkali metal salt and a thickness of the passivation layer is greater than or equal to about 0.05 micrometers.

In certain embodiments, a method of forming a passivation layer comprises reacting a substrate comprising an alkali metal with an inorganic gas to form the passivation layer on at least a portion of a surface of the substrate.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures:

FIG. 11A shows, according to certain embodiments, galvanostatic cycling of cells using Li showing cycles 1-40;

FIG. 11B shows, according to certain embodiments, galvanostatic cycling of cells using Li showing cycles 40-80;

FIG. 11C shows, according to certain embodiments, galvanostatic cycling of cells using Li showing cycles 80-120;

DETAILED DESCRIPTION

Described herein are articles and methods related to passivation layers. In some aspects, an alkali metal (e.g., lithium) may be reacted in an ex situ process with a gas (e.g., an inorganic gas) to yield a passivation layer on the alkali metal. The passivation layer may resultantly be fine-tuned, depending on the choice of reactant gas, reaction temperature, and reaction time, to comprise a high concentration of certain ionic (e.g., inorganic) compounds, such as oxides or fluorides of the alkali metal that the passivation layer is formed from. Furthermore, the reaction between the alkali metal layer and the gas produces a substantially homogenous passivation layer comprising said ionic compound. The resulting materials comprising an alkali metal and a passivation layer coating the alkali metal may be used, for example, as an electrode in an electrochemical device, such as a battery (e.g., a lithium metal anode in a lithium-based rechargeable battery). The passivation layer may be configured to protect the alkali metal electrode from corrosion that may be induced by a solvent, electrolyte, and/or additive used in the electrochemical device. Furthermore, the ionic passivation layer is electronically insulating but permits ionic conductivity sufficient to cycle the electrochemical cell comprising the alkali metal electrode. The formation of the passivation layer is therefore a controlled, ex situ growth of a homogeneous ionic layer on an alkali metal surface using a thermochemical approach, which is distinctive from conventional methods in several ways, explained in further detail below.

Figure 1:
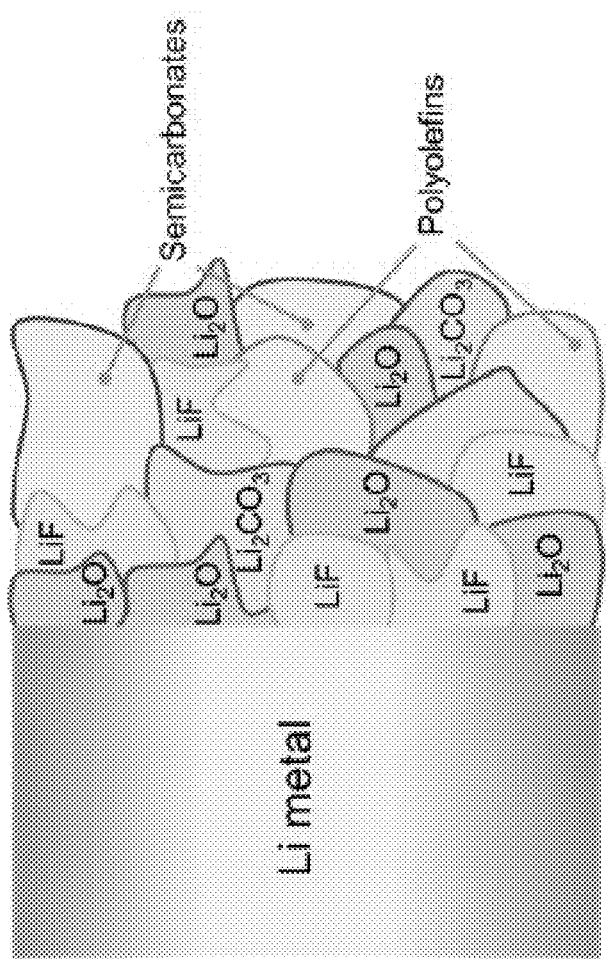
FIG. 1 shows, according to some embodiments, a schematic cross-sectional diagram of a conventional SEI layer on Li metal.

The passivation layers described herein have a uniform structure both in-plane and through-plane, which differs from conventional SEI layers formed on electrodes. Conventional SEI passivation layers, for example, often consist of distinct 'inner' and 'outer' domains. The SEI model shown in FIG. 1, for example, has been confirmed experimentally (e.g., by XPS) for Li metal substrates in various electrolytes. In some cases, the inner layer of a conventional SEI is typically found to contain anions (e.g. $O^{2-}$, $S^{2-}$, $F^-$, etc.) that are chemically and thermodynamically stable against the alkali metal (e.g., Li). The inner layer is either formed directly (e.g., $Li_2O$ through contaminant $O_2$ reaction with Li), or as a result of a secondary reduction of a solvent and/or electrolyte derived reduction intermediate (e.g., reduction of $CO_3^{2-}$ to form $Li_2O$). In contrast, the outer layer of the conventional SEI is predominantly composed of organic components such as oligomers, carbonates, alkoxides, and/or non-conducting polymers that have sparing solubility within the electrolyte of the assembled battery. The composition of the organic components of the SEI layer may be electrolyte-dependent. In carbonate solvents, for example, the organic, outer SEI layer consists of alkyl carbonates, such as semicarbonates $ROCO_2Li$) or dicarbonates (e.g., $(ROCO_2Li)_2$). In contrast, linear ether solvents (e.g., glymes) and cyclic ethers (e.g., tetrahydrofuran), typically favor formation of alkoxides (e.g., ROW in the outer layer. The various SEI components are usually not formed in isolation, resulting in the multilayer, inhomogeneous structure shown in FIG. 1. Resultantly, conventional SEI layers have a poorly-controlled morphology and chemical composition, thereby exacerbating inhomogeneous alkali metal deposition, round trip inefficiencies, and dendrite formation during cycling of the electrochemical cell.

As described herein, an ionic passivation layer may be provided by reacting an alkali metal directly with a gas, thereby forming a uniform layer of an alkali metal salt on the alkali metal (e.g., without 'inner' or 'outer' domains). After formation of the passivation layer, the article (e.g., electrode) may be used in an electrochemical cell, such as a battery. Upon immersion of the article in the solvent and/or electrolyte and subsequent operation of the electrochemical cell, the electrode containing the ionic passivation layer yields substantially limited growth of the organic 'outer' layer as compared to conventional SEI passivation layers that have been prepared by immersion and co-reduction techniques. The article and methods described herein therefore allow for conformal layer formation during fabrication of the passivation layer, a process which cannot be achieved using traditional coating by immersion of alkali metal substrates in electrolytes.

The formation of the passivation layer furthermore avoids the inclusion of reduced solvent and/or electrolyte products or contaminants that accompany conventional SEI growth upon immersion of an untreated alkali metal electrode directly into the electrochemical cell environment, since the passivation layer is formed by an ex situ reaction with gas prior to immersion of the electrode in the solvent and/or electrolyte of the electrochemical cell. The chemical composition of the ionic compound in the passivation layer (e.g., ionic compounds comprising $O^{2-}$, $F^-$, etc.) may therefore be selected, dependent on the reactive gas that is used. Additionally, higher loadings of the ionic compound may be introduced into the passivation layer, as compared to conventional SEI forming reactions, therefore allowing for control of the ionic compound loading through control of reaction conditions, such as temperature and reaction time. Precise engineering of the chemical composition of the passivation layer may be finely tuned, which is otherwise not possible in conventional approaches that are limited by the narrow subset of solvents and salts that are desirable for use in batteries.

Furthermore, mechanical approaches to improve conventional SET formation on Li use physical blocking strategies utilizing solid ceramics, polymer electrolytes, or nanoarchitected materials. Physical blocking layers can be penetrated by dendrites, and can also add costly or complex processing steps. These improvement strategies also commonly employ materials that are not themselves thermodynamically stable against Li, resulting in uncontrolled growth of reduced interphases that can negatively impact the battery. In contrast, the articles and methods described herein allow for the chemical composition of the passivation layer to be substantially consistent throughout its composition, and focus on imparting materials that are already thermodynamically stable against the alkali metal (e.g., ionic compounds of the alkali metal).

According to certain embodiments, an article is described. In some embodiments, the article is an electrode, such as a cathode or an anode. As used herein, "cathode" refers to an electrode in which the electrode active material is oxidized during cell charging and reduced during discharging, and "anode" refers to an electrode in which an electrode active material is reduced during cell charging and oxidized during discharging. In certain embodiments, the article is an electrode within an electrochemical cell, such as a battery.

Figure 2:
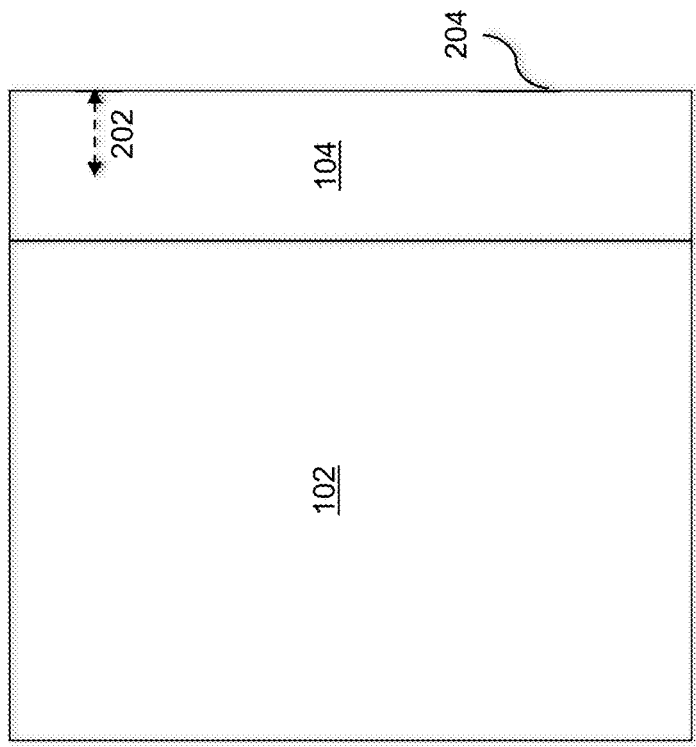
FIG. 2 shows, in accordance with certain embodiments, a schematic cross-sectional diagram of an article comprising an alkali metal layer and a passivation layer.
Figure 3:
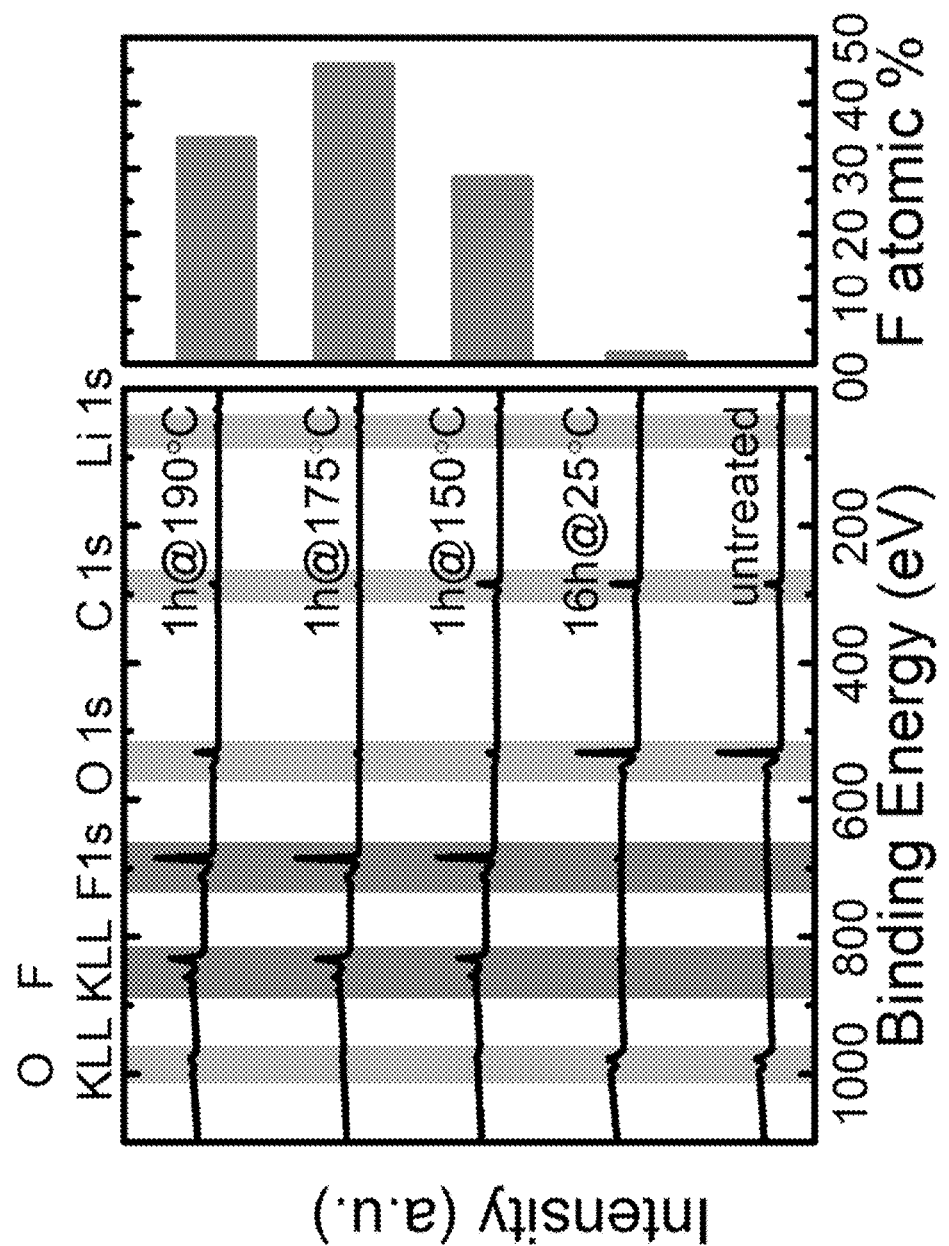
FIG. 3 shows, according to some embodiments, a X-ray photoelectron (XPS) spectrum of Li compared to Li reacted with $NF_3$ for various reaction times at various temperatures and the corresponding atomic percentage of fluorine in each sample.
Figure 4A:
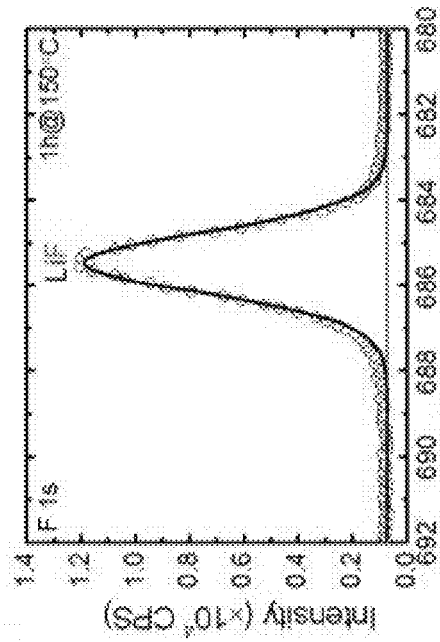
FIG. 4A shows, according to some embodiments, the elemental composition of Li reacted with $NF_3$ at various reaction times and temperatures.
Figure 4B:
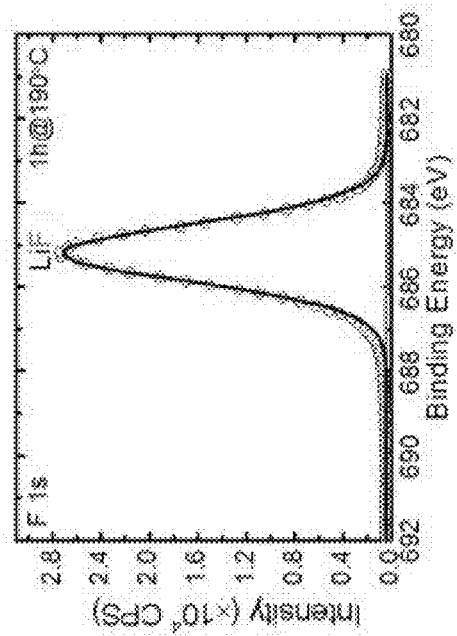
FIG. 4B shows, according to certain embodiments, a high resolution F 1s XPS spectrum of Li reacted with $NF_3$ for 1 hour at 150° C.
Figure 4C:
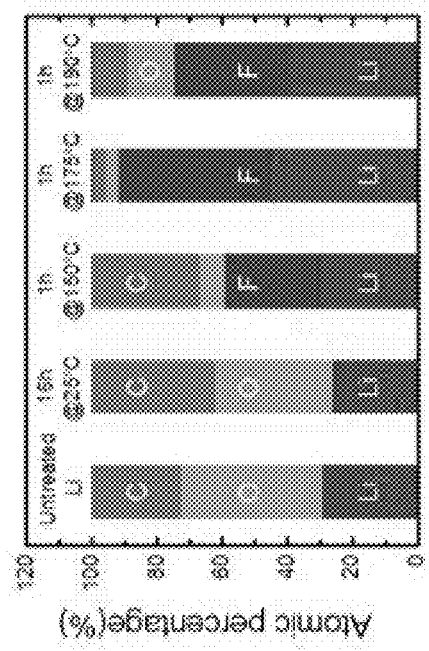
FIG. 4C shows, according to certain embodiments, a high resolution F 1s XPS spectrum of Li reacted with $NF_3$ for 1 hour at 175° C.
Figure 4D:
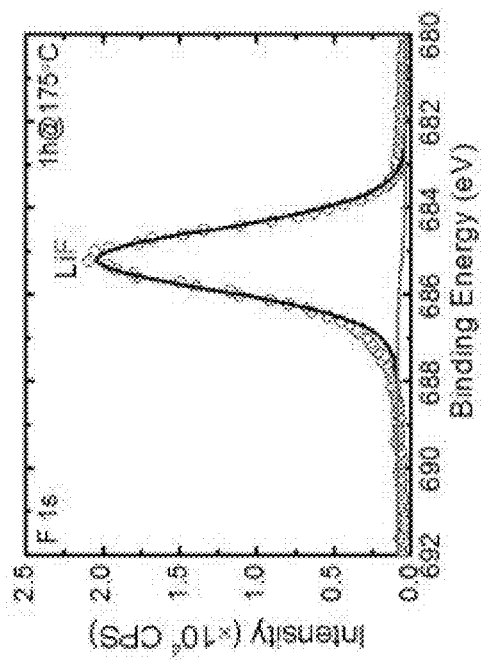
FIG. 4D shows, according to certain embodiments, a high resolution F 1s XPS spectrum of Li reacted with $NF_3$ for 1 hour at 190° C.

In some embodiments, the article comprises an alkali metal layer. The use of alkali metals is beneficial, in some aspects, for incorporation of the article (e.g., electrode) in an electrochemical cell (e.g., a battery). In certain embodiments, for example, the article is an electrode (e.g., an anode or a cathode) comprising an alkali metal layer (e.g., Li) which may be used in a battery (e.g., a Li-ion battery). FIG. 2 shows, in accordance with certain embodiments, a cross-sectional diagram of an article comprising an alkali metal layer. Referring to FIG. 2, article 100 comprising alkali metal layer 102 may be an electrode, in accordance with some embodiments.

The article (e.g., electrode) may comprise the alkali metal layer in any of a variety of suitable amounts. For example, in certain embodiments, the article comprises the alkali metal layer in an amount greater than or equal to 1 molar percent (mol. %), greater than or equal to 5 mol. %, greater than or equal to 10 mol. %, greater than or equal to 20 mol. %, greater than or equal to 30 mol. %, greater than or equal to 40 mol. %, greater than or equal to 50 mol. %, greater than or equal to 60 mol. %, greater than or equal to 70 mol. %, greater than or equal to 80 mol. %, greater than or equal to 90 mol. %, or greater than or equal to 95 mol. % based on the total number of moles of the article. In certain embodiments, the article comprises the alkali metal layer in an amount less than or equal to 99 mol. %, less than or equal to 95 mol. %, less than or equal to 90 mol. %, less than or equal to 80 mol. %, less than or equal to 70 mol. %, less than or equal to 60 mol. %, less than or equal to 50 mol. %, less than or equal to 40 mol. %, less than or equal to 30 mol. %, less than or equal to 20 mol. %, less than or equal to 10 mol. %, or less than or equal to 5 mol. % based on the total number of moles of the article. Combinations of the above recited ranges are also possible (e.g., the article comprises the alkali metal layer in an amount greater than or equal to 1 mol. % and less than or equal to 99 mol. %, the article comprises the alkali metal layer in an amount greater than or equal to 90 mol. % and less than or equal to 95 mol. %).

In certain non-limiting embodiments, the article is an alkali metal (e.g., Li) electrode comprising the alkali metal (e.g., Li) layer in amount greater than or equal to 90 mol. %, greater than or equal to 95 mol. %, or greater than or equal to 99 mol. % based on the total number of moles of the article.

In certain other, non-limiting embodiments, the article is an alkali metal (e.g., Li) electrode comprising the alkali metal (e.g., Li) layer in amount less than or equal to 10 mol. %, less than or equal to 5 mol. %, or less than or equal to 1 mol. % based on the total number of moles of the article. In some such embodiments, all or substantially all (e.g., 99.9 mol. %, 99 mol %, 98 mol. %) of the alkali metal in the alkali metal layer reacts (e.g., with a reactant gas) to form a passivation layer comprising an alkali metal salt, which is explained in further detail herein.

The alkali metal layer may comprise any of a variety of suitable alkali metals. For example, in certain embodiments, the alkali metal layer comprises lithium (Li), sodium (Na), potassium (K), rubidium (Rb) and/or cesium (Cs). For example, referring to FIG. 2, alkali metal layer 102 comprises Li, in certain non-limiting embodiments.

The alkali metal layer may comprise any of a variety of suitable amounts of one or more alkali metals (e.g., Li, Na, K, etc.). For example, in some embodiments, the alkali metal layer comprises greater than 0 mol. %, greater than or equal to 1 mol. %, greater than or equal to 5 mol. %, greater than or equal to 10 mol. %, greater than or equal to 20 mol. %, greater than or equal to 30 mol. %, greater than or equal to 40 mol. %, greater than or equal to 50 mol. %, greater than or equal to 60 mol. %, greater than or equal to 70 mol. %, greater than or equal to 75 mol. %, greater than or equal to 80 mol. %, greater than or equal to 85 mol. %, greater than or equal to 90 mol. %, greater than or equal to 95 mol. %, greater than or equal to 98 mol. %, greater than or equal to 99 mol. %, or greater than or equal to 99.9 mol. % of one or more alkali metals based on the total number of moles in the alkali metal layer. In certain embodiments, the alkali metal layer comprises less than or equal to 100 mol. %, less than or equal to 99.9 mol. %, less than or equal to 99 mol. %, less than or equal to 98 mol. %, less than or equal to 95 mol. %, less than or equal to 90 mol. %, less than or equal to 85 mol. %, less than or equal to 80 mol. %, less than or equal to 75 mol. %, less than or equal to 70 mol. %, less than or equal to 60 mol. %, less than or equal to 50 mol. %, less than or equal to 40 mol. %, less than or equal to 30 mol. %, less than or equal to 20 mol. %, less than or equal to 10 mol. %, less than or equal to 5 mol. %, or less than or equal to 1 mol. % of one or more alkali metals based on the total number of moles in the alkali metal layer. Combinations of the above recited ranges are also possible (e.g., the alkali metal layer comprises greater than or equal to 70 mol. % and less than or equal to 100 mol. % of one or more alkali metals, the alkali metal layer comprises greater than or equal to 90 mol. % and less than or equal to 95 mol. % of one or more alkali metals). The amount of one or more alkali metals in the alkali metal layer may be determined by mass spectrometry (e.g., inductively coupled plasma mass spectrometry), XPS, SEM (e.g., high resolution SEM, focus ion beam SEM), and/or transmission electron microscopy (TEM).

In addition to the alkali metal, the alkali metal layer may comprise one or more additives. Examples of additives may include an electroactive material, a binder, and/or a filler. In some embodiments, an electroactive material may be configured to adjust the electrode potential window, which may be beneficial depending on the particular solvent and/or electrolyte used during operation of the electrochemical cell. In certain embodiments, the electroactive material comprises carbon (e.g., graphite, graphene, petroleum coke, and/or mesocarbon microbeads (MCMB)), silicon, antimony, tin, tin dioxide, and/or titanium dioxide. Non-limiting examples of suitable fillers and/or binders include polymers (e.g., polyacrylonitrile (PAN) and/or carboxymethyl cellulose (CMC)). Other fillers and/or binders are possible.

In certain embodiments, the article comprises a passivation layer. As shown in FIG. 2, for example, article 100 may comprise passivation layer 104. The term passivation layer, as used herein, refers to a layer of material that functions as a shielding and/or coating layer on a substrate and is formed from a chemical reaction of the substrate with a reactant. The use of a passivation layer may be beneficial because, in some cases, the passivation layer protects the substrate that it is disposed on from deterioration and/or decay that may be caused by external forces (e.g., a solvent and/or electrolyte of an electrochemical cell). In some embodiments, the passivation layer is configured to protect at least a portion of the article from corrosion. In certain aspects for example, an article (e.g., electrode) may comprise an alkali metal layer and a passivation layer, and the passivation layer may be configured to protect at least a portion of the article (e.g., electrode) from corrosion. Corrosion of an electrode is caused, in some cases, by cycling an electrochemical cell comprising the electrode, therefore causing subsequent reactivity between the electrode and the solvent and/or electrolyte of the electrochemical cell. Other external forces in the electrochemical cell may additionally cause corrosion of the electrode, such as gases dissolved in the solvent of the electrochemical cell.

As is described herein in greater detail, the passivation layer may be formed by reacting the alkali metal layer with a gas. Resultantly, in certain embodiments, the passivation layer comprises a product of the reaction between the alkali metal layer and the gas. In some cases, as a result of reacting the alkali metal layer with a gas, the passivation layer is disposed on the alkali metal layer. In certain embodiments the passivation layer may be in direct contact with the alkali metal layer. For example, referring to FIG. 2, passivation layer 104 is in direct contact with alkali metal layer 102. In some aspects, it is beneficial for the passivation layer to be in direct contact with the alkali metal layer so that the passivation layer may protect the alkali metal layer (e.g., from corrosion), as explained above. According to certain embodiments, the passivation layer is configured such that a surface of the passivation layer is exposed to an atmosphere surrounding the article. For example, in reference to FIG. 2, surface 204 of passivation layer 104 is exposed to atmosphere 302 surrounding the article. In some cases, the passivation layer is configured such that at least a portion of the alkali metal layer is not exposed to an atmosphere surrounding the article. Referring to FIG. 2, for example, passivation layer 104 is configured such that at least a portion of alkali metal layer 102 is not exposed to atmosphere 302 surrounding article 100.

The article (e.g., electrode) may comprise the passivation layer in any of a variety of suitable amounts. For example, in certain embodiments, the article comprises the passivation layer in an amount greater than or equal to 1 mol. %, greater than or equal to 5 mol. %, greater than or equal to 10 mol. %, greater than or equal to 20 mol. %, greater than or equal to 30 mol. %, greater than or equal to 40 mol. %, greater than or equal to 50 mol. %, greater than or equal to 60 mol. %, greater than or equal to 70 mol. %, greater than or equal to 80 mol. %, greater than or equal to 90 mol. %, or greater than or equal to 95 mol. % based on the total number of moles of the article. In certain embodiments, the article comprises the passivation layer in an amount less than or equal to 99 mol. %, less than or equal to 95 mol. %, less than or equal to 90 mol. %, less than or equal to 80 mol. %, less than or equal to 70 mol. %, less than or equal to 60 mol. %, less than or equal to 50 mol. %, less than or equal to 40 mol. %, less than or equal to 30 mol. %, less than or equal to 20 mol. %, less than or equal to 10 mol. %, or less than or equal to 5 mol. % based on the total number of moles of the article. Combinations of the above recited ranges are also possible (e.g., the article comprises the passivation layer in an amount greater than or equal to 1 mol. % and less than or equal to 99 mol. %, the article comprises the passivation layer in an amount greater than or equal to 90 mol. % and less than or equal to 95 mol. %).

In certain non-limiting embodiments, the article is an alkali metal (e.g., Li) electrode comprising the passivation layer in amount less than or equal to 10 mol. %, less than or equal to 5 mol. %, or less than or equal to 1 mol. % based on the total number of moles of the article.

In certain other, non-limiting embodiments, the article is an alkali metal (e.g., Li) electrode comprising the passivation layer in amount greater than or equal to 90 mol. %, greater than or equal to 95 mol. %, or greater than or equal to 99 mol. % based on the total number of moles of the article. In some such embodiments, all or substantially all (e.g., 99.9 mol. %, 99 mol %, 98 mol. %) of the alkali metal (e.g., Li) in the alkali metal layer may react (e.g., with a reactant gas) to form the passivation layer comprising an alkali metal salt.

In some aspects, the passivation layer substantially covers the surface area of the alkali metal layer. For example, in certain embodiments, at least about 50%, at least about 60%, at least about 70%, at least about 80%, at least about 85%, at least about 90%, at least about 95%, at least about 98%, or at least about 99% of the surface area of the alkali metal layer is substantially covered by the passivation layer. In some cases, less than or equal to about 100%, less than or equal to about 99%, less than or equal to about 98%, less than or equal to about 97%, less than or equal to about 90%, less than or equal to about 85%, less than or equal to about 80%, less than or equal to about 70%, or less than or equal to about 60% of the surface area of the alkali metal layer is covered by the passivation layer. Combinations of the above recited ranges are also possible (e.g., at least about 50% and less than or equal to 100% of the surface area of the alkali metal layer is covered by the passivation layer, at least about 90% and less than or equal to about 98% of the alkali metal layer is covered by the passivation layer).

In some embodiments, the passivation layer is crystalline. For example, referring to FIG. 2, passivation layer 104 may be crystalline. In some embodiments, for example, the passivation layer comprises nanocrystals (e.g., cubic nanocrystals) with various sizes (e.g., greater than or equal to 1 nm, greater than or equal to 10 nm, greater than or equal to 50 nm, greater than or equal to 100 nm, etc.). In certain embodiments, the crystalline passivation layer comprises one or more crystallographic defects (e.g., a point defect) and/or grain boundaries, so that the solid state passivation layer may conduct ions (e.g., from the alkali metal layer, through the passivation layer, and/or to an atmosphere surrounding the article). Methods of determining the crystallinity of the passivation layer, and/or the physical properties of the crystalline passivation layer (e.g., nanocrystal size) include, for example, TEM (e.g., electron diffraction in TEM), atomic force microscopy (AFM) and/or XRD.

According to certain embodiments, the passivation layer comprises an alkali metal salt. In some embodiments, the alkali metal salt is an alkali metal salt of the alkali metal layer. Resultantly, the alkali metal salt may be chemically and thermodynamically stable against the alkali metal. In some aspects, the alkali metal salt is an ionic compound. Referring to FIG. 2, for example, passivation layer 104 may comprise an alkali metal salt that is an ionic compound. As used herein, the term ionic compound refers to a chemical compound composed of ions held together by electrostatic attraction between oppositely charged ions (e.g., ionic bonding). A passivation layer comprising an ionic alkali metal salt may be advantageous, according to some embodiments, to promote ionic conductivity of the passivation layer.

The alkali metal salt may be any of a variety of alkali metal salts. According to certain embodiments, the alkali metal salt is an alkali metal fluoride. In some embodiments, for example, the alkali metal salt is LiF, NaF, or KF. In certain embodiments, the alkali metal salt is an alkali metal oxide. For example, according to some embodiments, the alkali metal oxide is $Li_2O$, $Na_2O$, or $K_2O$. In certain aspects, the alkali metal may be stable across wide potential ranges. For example, in certain embodiments, the alkali metal may be stable at a potential between greater than or equal to 0 V vs. $Li/Li^+$ and less than or equal to 6 V vs. $Li/Li^+$.

In certain embodiments, the passivation layer is ionically conductive. Those of ordinary skill in the art would be familiar with ionic conductivity, which refers to the ability of a material to conduct ions to a substantial degree. Those of ordinary skill in the art would be capable of determining whether a material is ionically conductive, and quantifying the degree of its ionic conductivity, by calculating the ionic conductivity using, for example, ionic conductivity meters and/or electrochemical impedance data. An ionically conductive passivation layer can be beneficial, according to certain embodiments, as it may enhance the transport of ions (e.g., electrochemically active ions, such as $Li^+$) through the bulk of the passivation layer, which can be useful in enhancing the performance of certain devices (e.g., electrochemical cells).

The passivation layer may have any of a variety of suitable ionic conductivities. For example, in certain embodiments, the ionic conductivity (e.g., at a temperature between 20° C. to 25° C.) of the passivation layer is greater than or equal to $10^{-15}$ S/cm, greater than or equal to $10^{-14}$ S/cm, greater than or equal to $10^{-13}$ S/cm, greater than or equal to $10^{-12}$ S/cm, greater than or equal to $10^{-11}$ S/cm, greater than or equal to $10^{-10}$ S/cm, greater than or equal to $10^{-9}$ S/cm, or greater than or equal to $10^{-8}$ S/cm. In some embodiments, the ionic conductivity of the passivation layer is less than or equal to $10^{-7}$ S/cm, less than or equal to $10^{-8}$ S/cm, less than or equal to $10^{-9}$ S/cm, less than or equal to $10^{-10}$ S/cm, less than or equal to $10^{-11}$ S/cm, less than or equal to $10^{-12}$ S/cm, less than or equal to $10^{-13}$ S/cm, less than or equal to $10^{-14}$ S/cm. Combinations of the above recited ranges are also possible (e.g., the ionic conductivity of the passivation layer is greater than or equal to $10^{-15}$ S/cm and less than or equal to $10^{-7}$ S/cm, the ionic conductivity of the passivation layer is greater than or equal to $10^{-12}$ S/cm and less than or equal to $10^{-10}$ S/cm).

In certain embodiments, the passivation layer is electronically insulating. Those of ordinary skill in the art would be familiar with electronically insulating materials, which are materials that have the ability to restrict the flow of electrons such that electrons are not transported through the material to a substantial degree. In some embodiments, the electronically insulating passivation layer has a resistivity (e.g., at a temperature between 20° C. to 25° C.) less than or equal to $10^{15}$ ohm-cm, less than or equal to $10^{14}$ ohm-cm, less than or equal to $10^{13}$ ohm-cm, or less than or equal to $10^{12}$ ohm-cm. In some embodiments, the resistivity of the passivation layer is greater than or equal to $10^{11}$ ohm-cm, greater than or equal to $10^{12}$ ohm-cm, greater than or equal to $10^{13}$ ohm-cm, greater than or equal to $10^{14}$ ohm-cm. Combinations of the above recited ranges are also possible (e.g., the resistivity of the passivation layer is less than or equal to $10^{15}$ ohm-cm and greater than or equal to $10^{11}$ ohm-cm, the resistivity of the passivation layer is less than or equal to $10^{14}$ ohm-cm and greater than or equal to $10^{12}$ ohm-cm). Those of ordinary skill in the art would be capable of determining whether a material is electronically insulating, and quantifying the degree of its electronic insulation, by making resistance measurements using, for example, Ohm's Law. Other methods of measuring resistivity include using probe instruments, such as a 4-point probe.

The passivation layer may comprise a substantially small amount of contaminants, as compared to an alkali metal layer comprising a passivation layer that is formed by conventional methods (e.g., immersion and co-reduction techniques). Conventional passivation layers may comprise contaminants such as carbon, hydrogen, and/or oxygen, though other contaminants are possible. Accordingly, in some embodiments, the passivation layer described herein comprises a substantially small amount of carbon, hydrogen, and/or oxygen. Without wishing to be bound by theory, in some embodiments the contaminant oxygen in the passivation layer does not include the amount of oxygen from the oxide of the alkali metal oxide (e.g., $Li_2O$, $Na_2O$, or $K_2O$), which is generated as a result of reacting the alkali metal with a gas. In some embodiments, the amount of contaminant oxygen in the passivation layer is determined when the passivation layer comprises an alkali metal fluoride (e.g., LiF).

According to certain embodiments, the amount of contaminants in the passivation layer may be measured at a certain depth of the passivation layer (e.g., at a depth of 0.01 micrometers, at depth of 0.1 micrometers, at a depth of 0.2 micrometers, at a depth of 0.5 micrometers etc.). For example, as shown in FIG. 2, in some embodiments the amount of contaminants in passivation layer 104 may be measured at depth 202.

In certain aspects, the amount of contaminants (e.g., carbon, hydrogen, and/or oxygen) in the passivation layer measured at a depth of about 0.01 micrometers may be substantially low. In some embodiments, for example, the amount of carbon, hydrogen, and/or oxygen at a depth of about 0.01 micrometers in the passivation layer is less than or equal to 7 mol. %, less than or equal to 6 mol. %, less than or equal to 5 mol. %, less than or equal to 4 mol. %, less than or equal to 3 mol. %, less than or equal to 2 mol. %, less than or equal to 1 mol. %, less than or equal to 0.5 mol. %, or less than or equal to 0.1 mol. % versus the total moles of the passivation layer. In certain embodiments, the amount of carbon, hydrogen, and/or oxygen at a depth of about 0.01 micrometers in the passivation layer is greater than or equal to 0.01 mol. %, greater than or equal to 0.1 mol. %, greater than or equal to 0.5 mol. %, greater than or equal to 1 mol. %, greater than or equal to 2 mol. %, greater than or equal to 3 mol. %, greater than or equal to 4 mol. %, greater than or equal to 5 mol. %, or greater than or equal to 6 mol. %. versus the total moles of the passivation layer. Combinations of the above recited ranges are also possible (e.g., the amount of carbon, hydrogen, and/or oxygen in the passivation layer is less than or equal to 7 mol. % and greater than or equal to 0.01 mol. %, the amount of carbon, hydrogen, and/or oxygen in the passivation layer is less than or equal to 5 mol. % and greater than or equal to 3 mol. %). The amount of contaminants in the passivation layer (e.g., at a depth of 0.1 micrometers) may be determined by XPS, SEM (e.g., coupled with energy-dispersive X-ray spectroscopy), and/or TEM (e.g., coupled with electron energy loss spectroscopy).

In some embodiments, the amount of contaminants in the passivation layer is not dependent on the depth of which the contaminants are measured. For example, in certain non-limiting embodiments, the amount of contaminants in the passivation layer at a first depth (e.g., 0.01 micrometers) does not vary substantially from the amount of contaminants in the passivation layer at a second depth that is different from the first depth (e.g., 0.5 micrometers). In certain embodiments, the amount of contaminants in the passivation layer at a first depth may not vary by more than 1%, more than 2%, more than 3%, more than 4%, or more than 5% from the amount of contaminants in the passivation layer a second depth that is different from the first depth.

In some embodiments, the amount of contaminants may be measured at the surface of the passivation layer. For example, referring to FIG. 2, the amount of contaminants at surface 204 of passivation layer 102 may be measured. In certain aspects, the amount of contaminants (e.g., carbon, hydrogen, and/or oxygen) at the surface of the passivation layer may be substantially low. According to certain embodiments, for example, the amount of contaminants (e.g., carbon, hydrogen, and/or oxygen) at the surface of the passivation layer is less than or equal to 2 mol. %, less than or equal to 1.5 mol. %, less than or equal to 1 mol. %, less than or equal to 0.5 mol. %, or less than or equal to 0.1 mol. % versus the total moles of the passivation layer. In some embodiments, the amount of contaminants (e.g., carbon, hydrogen, and/or oxygen) at the surface of the passivation layer is greater than or equal to 0.01 mol. %, greater than or equal to 0.1 mol. %, greater than or equal to 0.5 mol. %, greater than or equal to 1 mol %, or greater than or equal to 1.5 mol. % versus the total moles of the passivation layer. The amount of contaminants at the surface of the passivation layer may be determined by XPS, SEM (e.g., coupled with energy-dispersive X-ray spectroscopy), and/or TEM (e.g., coupled with electron energy loss spectroscopy).

According to certain embodiments, the passivation layer is conformal to the alkali metal layer. In some aspects, for example, the passivation layer comprises a substantially small amount of defects. In certain embodiments, one or more defects are observable to the human eye (e.g., with or without the use of microscopic techniques). An example of a defect includes, in certain embodiments, a crack in the passivation layer. Without wishing to be bound by theory, the shape and/or size of the defect may be non-limiting as long as the defect is detectable. For example, in certain embodiments, the defect may have a maximum dimension of greater than or equal to 5 nm, greater than or equal to 10 nm, greater than or equal to 20 nm, greater than or equal to 50 nm, greater than or equal to 100 nm, and the like.

A passivation layer substantially free from defects (e.g., cracks) may be advantageous, because it allows for ions (e.g., $Li^+$ ions) to diffuse through the passivation layer homogenously and at similar rates. Resultantly, the overall performance (e.g., ionic conductivity) of the article may be improved, as the transport of ions through the bulk of the passivation layer may enhance the transport of ions in the electrochemical cell (e.g., battery).

In certain embodiments, the passivation layer has less than or equal to about 20 defects per $mm^2$, less than or equal to about 10 defects per $mm^2$, less than or equal to about 5 defects per $mm^2$, less than or equal to about 4 defects per $mm^2$, less than or equal to about 3 defects per $mm^2$, or less than or equal to about 2 defects per $mm^2$. In some embodiments, the passivation layer has greater than or equal to about 1 defect per $mm^2$, greater than or equal to about 2 defects per $mm^2$, greater than or equal to about 3 defects per $mm^2$, greater than or equal to about 4 defects per $mm^2$, greater than or equal to about 5 defects per $mm^2$, or greater than or equal to about 10 defects per $mm^2$. Combinations of the above recited ranges are also possible (e.g., the passivation layer has less than or equal to about 20 defects per $mm^2$ and greater than or equal to 1 defect per $mm^2$, the passivation layer has less than or equal to about 5 defects per $mm^2$ and greater than or equal to about 3 defects per $mm^2$. The number of defects in the passivation layer may be determined by AFM, SEM and/or TEM.

In certain cases, it may be beneficial to form a non-conformal passivation layer on the alkali metal. For example, in some embodiments, the passivation layer may intentionally comprise defects (e.g., cracks). A non-conformal passivation layer may be beneficial, in some aspects, to intentionally form an 'outer' domain comprising organic components on the alkali metal layer and/or the passivation layer, depending on the use of the article comprising the alkali metal layer and passivation layer.

According to certain embodiments, the passivation layer may have any of a variety of suitable thicknesses. For example, in some embodiments, the thickness of the passivation layer is less than or equal to 1 micrometer, less than or equal to 0.9 micrometers, less than or equal to 0.8 micrometers, less than or equal to 0.7 micrometers, less than or equal to 0.6 micrometers, less than or equal to 0.5 micrometers, less than or equal to 0.4 micrometers, less than or equal to 0.3 micrometers, less than or equal to 0.2 micrometers, less than or equal to 0.1 micrometers, or less than or equal to 0.05 micrometers. In certain embodiments, the thickness of the passivation layer is greater than or equal to 0.01 micrometers, greater than or equal to 0.05 micrometers, greater than or equal to 0.1 micrometers, greater than or equal to 0.2 micrometers, greater than or equal to 0.3 micrometers, greater than or equal to 0.4 micrometers, greater than or equal to 0.5 micrometers, greater than or equal to 0.6 micrometers, greater than or equal to 0.7 micrometers, greater than or equal to 0.8 micrometers, or greater than or equal to 0.9 micrometers. Combinations of the above recited ranges are also possible (e.g., the thickness of the passivation layer is less than or equal to 1 micrometer and greater than or equal to 0.01 micrometers, the thickness of the passivation layer is less than or equal to 0.6 micrometers and greater than or equal to 0.3 micrometers). The thickness of the passivation layer may be determined using XPS depth profiling, SEM, and/or TEM.

Certain embodiments described herein are related to a method of forming a passivation layer. In some aspects, the passivation layer may be formed on a substrate (e.g., an electrode). According to certain embodiments, the substrate comprises an alkali metal. For example, in certain embodiments, the substrate comprises Li, Na, and/or K. The substrate may comprise the alkali metal in any of a variety of suitable amounts, including any of the amounts described herein with respect to the amount of alkali metal in the alkali metal layer (e.g., the substrate comprises greater than or equal to 75 mol. % of one or more alkali metals based on the total number of moles in the substrate, the substrate comprises greater than or equal to 99.9 mol. % of one or more alkali metals based on the total number of moles in the substrate). In some embodiments, the substrate is at least partially in the form of a two-dimensional structure, such as a sheet and/or a layer (e.g., an alkali metal layer). In certain embodiments, the substrate is at least partially in the form of a three-dimensional structure (e.g. a coordination cage, a covalent organic framework, a nanostructure). In some such embodiments, the alkali metal (e.g., Li) may be wicked into at least a portion of the structure. In certain embodiments, the three-dimensional structure may comprise a carbon framework (e.g., graphite or graphene). In some aspects, the substrate comprises the one or more alkali metals on at least a portion of the surface of the substrate.

In certain embodiments, the method comprises reacting a substrate comprising an alkali metal with a gas (e.g., an inorganic gas) and forming the passivation layer on at least a portion of the substrate. In certain embodiments, reacting is performed in a reactor (e.g., a stainless steel reactor). In some aspects, the gas is purged into the reactor at a predetermined temperature and/or pressure, and/or for a predetermined reaction time. According to some embodiments, certain reaction conditions, such as the temperature, pressure, and or reaction time, may be finely-tuned in order to form the homogenous, conformal passivation layer on the substrate (e.g., article comprising one or more alkali metals).

In some embodiments, the gas is an inorganic gas. In certain embodiments, the inorganic gas is a non-acidic gas. In some aspects, the inorganic gas is an acidic gas. In certain embodiments, the gas comprises nitric oxide (NO), nitrous oxide ($N_2O$), nitrogen trifluoride ($NF_3$), sulfur hexafluoride ($SF_6$), dioxygen ($O_2$), dinitrogen ($N_2$), and/or mixtures thereof. In certain embodiments, the gas may be in the form of a vapor.

In certain embodiments, when $N_2O$, NO, and/or $O_2$ is used as the gas, the passivation layer comprises $A_2O$, wherein A is an alkali metal (e.g., Li, Na, K). In some such embodiments, the passivation layer may comprise $A_2O$ in an amount greater than or equal to 75 mol. %, 85 mol. %, 90 mol. %, 95 mol. %, or 99 mol. % based on the total number of moles in the passivation layer. In certain embodiments wherein $NF_3$ and/or $SF_6$ is used as the gas, the passivation layer comprises AF, wherein A is an alkali metal (e.g., Li, Na, K). In some such embodiments, the passivation layer may comprise AF in an amount greater than or equal to 75 mol. %, 85 mol. %, 90 mol. %, 95 mol. %, or 99 mol. % based on the total number of moles in the passivation layer.

In certain embodiments, the substrate comprising one or more alkali metals may be reacted with the gas at any of a variety of suitable temperatures. In certain embodiments, reacting is performed at a temperature greater than or equal to about 20° C., greater than or equal to about 50° C., greater than or equal to about 100° C., greater than or equal to about 125° C., greater than or equal to about 150° C., greater than or equal to about 160° C., greater than or equal to about 175° C., greater than or equal to about 200° C., greater than or equal to about 225° C., greater than or equal to about 250° C., or greater than or equal to about 275° C. In some embodiments, reacting is performed at a temperature of less than or equal to about 300° C., less than or equal to about 275° C., less than or equal to about 250° C., less than or equal to about 225° C., less than or equal to about 200° C., less than or equal to about 175° C., less than or equal to about 160° C., less than or equal to about 150° C., less than or equal to about 125° C., less than or equal to about 100° C., or less than or equal to about 50° C. Combinations of the above recited ranges are also possible (e.g., reacting is performed at a temperature between greater than or equal to about 20° C. and less than or equal to about 250° C., reacting is performed at a temperature is between greater than or equal to about 20° C. and less than or equal to about 175° C., reacting is performed at a temperature is between greater than or equal to about 20° C. and less than or equal to about 160° C.).

In some embodiments, the reacting temperature may depend, at least in part, on the composition of the substrate (e.g., electrode) comprising the alkali metal layer. In certain aspects, for example, it may be advantageous to react the substrate comprising an alkali metal with a gas at the melting temperature of the alkali metal. In some embodiments, it may be advantageous to react the substrate comprising an alkali metal with a gas slightly below (e.g., at least 1° C. below, at least 2° C. below, at least 3° C. below, at least 4° C. below, at least 5° C. below, etc.) the melting temperature of the alkali metal. Such reaction conditions may, in some cases, cause at least a portion of the alkali metal to melt to a molten, flowable form, which may aid in the reactivity between the alkali metal layer and the gas (e.g., due to the increased surface area of the alkali metal layer when at least a portion is in molten form).

In certain embodiments, the substrate (e.g., the alkali metal layer) comprises lithium. In some such embodiments, the reacting temperature is in a range of no less than about 160° C. below the melting temperature of the alkali metal (e.g., lithium) and no more than about 100° C. above the melting temperature of the alkali metal (e.g., lithium). In certain embodiments, the substrate (e.g., the alkali metal layer) comprises sodium. In some such embodiments, the reacting temperature is in a range of no less than about 80° C. below the melting temperature of the alkali metal (e.g., sodium) and no more than about 100° C. above the melting temperature of the alkali metal (e.g., sodium). In certain embodiments, the substrate (e.g., the alkali metal layer) comprises potassium. In some such embodiments, the reacting temperature is in a range of no less than about 40° C. below the melting temperature of the alkali metal (e.g., potassium) and no more than about 100° C. above the melting temperature of the alkali metal (e.g., potassium).

The substrate comprising one or more alkali metals may be reacted with the gas at any of a variety of suitable pressures. For example, in certain embodiments, reacting is performed at about atmospheric pressure (e.g., between greater than or equal to about 13 psi and less than or equal to about 15 psi). In some embodiments, reacting is performed at greater than atmospheric pressure. For example, in certain embodiments, reacting is performed at greater than or equal to about 15 psi, greater than or equal to about 16 psi, greater than or equal to about 16 psi, greater than or equal to about 17 psi, greater than or equal to about 18 psi, greater than or equal to about 19 psi, greater than or equal to about 20 psi, or greater than or equal to about 25 psi. In some embodiments, reacting is performed at less than or equal to about 30 psi, less than or equal to about 25 psi, less than or equal to about 20 psi, less than or equal to about 19 psi, less than or equal to about 18 psi, less than or equal to about 17 psi, or less than or equal to about 16 psi. Combinations of the above recited ranges are also possible (e.g., reacting is performed at greater than or equal to about 13 psi and less than or equal to about 30 psi, reacting is performed at greater than or equal to 19 psi and less than or equal to 25 psi).

The substrate comprising one or more alkali metals may be reacted with the gas for any of a variety of suitable times. For example, in some embodiments, reacting is performed for greater than or equal to 30 minutes, greater than or equal to 1 hour, greater than or equal to 5 hours, greater than or equal to 10 hours, greater than or equal to 15 hours, greater than or equal to 20 hours, greater than or equal to 30 hours, greater than or equal to 40 hours, greater than or equal to 50 hours, or greater than or equal to 60 hours. In certain embodiments, reacting is performed for less than or equal to 70 hours, less than or equal to 60 hours, less than or equal to 50 hours, less than or equal to 40 hours, less than or equal to 30 hours, or less than or equal to 20 hours, less than or equal to 15 hours, less than or equal to 10 hours, less than or equal to 5 hours, or less than or equal to 1 hour. Combinations of the above recited ranges are also possible (e.g., reacting is performed for greater than or equal to 30 minutes and less than or equal to 60 hours, reacting is performed for greater than or equal to 5 hours and less than or equal to 10 hours).

According to certain embodiments, after forming the first passivation layer on at least a portion of the substrate, the method may further comprise reacting the substrate with a second gas to form a second passivation layer. In some such embodiments, the second gas used to form the second passivation layer may be different than the first gas used to form the first passivation layer. In certain embodiments, the second passivation layer may in direct contact with the substrate and/or the first passivation layer. For example, in certain non-limiting embodiments, the first passivation layer is in direct contact with the alkali metal layer, and the second passivation layer is in direct contact with the first passivation layer. In certain embodiments, the first passivation layer comprises a first alkali metal salt and the second passivation layer comprises a second alkali metal salt that is different from the first alkali metal salt.

The deficiencies in conventional passivation layers limit the energy density of traditional lithium-ion batteries. In certain embodiments, the alkali metal (e.g., Li) electrodes (e.g. anodes) comprising a passivation layer have an increased cell energy density as compared to a conventional Li-ion battery and/or a graphite anode comprising a passivation layer prepared by conventional methods, such as immersion and co-reduction techniques. In certain aspects, for example, the energy density of an electrode comprising a passivation layer described herein may be at least two times greater, at least three times greater, at least four times greater, or at least five times greater as compared to a conventional Li-ion battery and/or a graphite anode comprising a passivation layer prepared by conventional methods, such as immersion and co-reduction techniques.

The use of Li-based electrodes in rechargeable batteries is of particular interest due to the high reactivity of Li anodes. As explained herein, however, challenges of using Li-based electrodes include their tendency to form dendrites during cycling of the electrochemical cell, which leads to cell short-circuiting and safety issues. According to certain aspects, the passivation layers described herein may decrease dendrite formation on the Li electrode, as compared to native Li electrodes and/or passivation layers on Li electrodes that have been formed by conventional methods, such as immersion and co-reduction techniques. Decreases in dendrite formation may occur, in certain embodiments, due to the substantially homogenous nature of the passivation layer and/or the chemical and thermodynamic stability of the passivation layer towards the alkali metal. Therefore, in certain embodiments, the passivation layers may have an increased stability, leading to an increase in the short-circuiting time of an electrochemical cell (e.g., a battery). In certain aspects, for example, the short-circuiting time of an electrochemical cell (e.g., a battery) comprising an electrode comprising a passivation layer described herein may be at least two times greater, at least three times greater, at least four times greater, or at least five times greater as compared to a native alkali metal electrode without a passivation layer and/or an electrode comprising a passivation layer prepared by conventional methods, such as immersion and co-reduction techniques.

In some embodiments, the article (e.g., electrode) is used in an electrochemical cell. According to some such embodiments, the electrochemical cell may be a rechargeable battery or a non-rechargeable battery. In certain embodiments, for example, the battery is a lithium-based rechargeable battery. In some other embodiments, the battery is a primary cell that allows for the safer and/or more complete utilization of the alkali metal (e.g., Li). In some embodiments, the battery (e.g., rechargeable battery) may be used in transportation (e.g., electric vehicles) or grid-storage applications (e.g., electrical power grids for the storage of renewable energy).

As noted above, in certain embodiments, the electrochemical cell comprises one or more electrodes. For example, in certain embodiments, the electrochemical cell comprises an anode and a cathode.

The anode may comprise a variety of anode active materials. As used herein, the term "anode active material" refers to any electrochemically active species associated with the anode. In some embodiments, the anode active material is an alkali metal, such as Li. Suitable Li-containing anode active materials for use in the anode include, but are not limited to, lithium metal such as lithium foil and lithium deposited onto a substrate, and lithium alloys (e.g., lithium-aluminum alloys and lithium-tin alloys). While these materials may be preferred in some embodiments, other cell chemistries are also contemplated. In some embodiments, the electrodes may comprise one or more binder materials (e.g., polymers, etc.).

In some embodiments, the anode may have a thickness of less than or equal to 1500 micrometers, less than or equal to 1250 micrometers, less than or equal to 1000 micrometers, less than or equal to 750 micrometers, less than or equal to 500 micrometers, or less than or equal to 200 micrometers. In certain embodiments, the anode may have a thickness of at least 1 micrometer, at least 5 micrometers, at least 10 micrometers, at least 25 micrometers, at least 50 micrometers, at least 100 micrometers, or at least 150 micrometers. Combinations of the above-referenced ranges are also possible (e.g., from 1 micrometer to 1500 micrometers). Other ranges are also possible.

The cathode may comprise a variety of cathode active materials. As used herein, the term "cathode active material" refers to any electrochemically active species associated with the cathode. In some embodiments, the cathode active material comprises one or more metal oxides. In some embodiments, an intercalation cathode (e.g., a lithium-intercalation cathode) may be used. Non-limiting examples of suitable materials that may intercalate ions of an electroactive material (e.g., alkaline metal ions) include metal oxides, titanium sulfide, and iron sulfide. In some embodiments, the cathode is an intercalation cathode comprising a lithium transition metal oxide or a lithium transition metal phosphate. In certain aspects, a conversion cathode may be used. Non-limiting examples of conversion cathodes include cathodes comprising sulfur (e.g., Li—S) and cathodes comprise $O_2$ (e.g., Li—$O_2$).

In some embodiments, the cathode may have a thickness of less than or equal to 2000 micrometers, less than or equal to 1500 micrometers, less than or equal to 1250 micrometers, less than or equal to 1000 micrometers, less than or equal to 750 micrometers, less than or equal to 500 micrometers, or less than or equal to 200 micrometers. In certain embodiments, the cathode may have a thickness of at least 1 micrometer, at least 5 micrometers, at least 10 micrometers, at least 25 micrometers, at least 50 micrometers, at least 100 micrometers, or at least 150 micrometers. Combinations of the above-referenced ranges are also possible (e.g., from 1 micrometer to 2000 micrometers). Other ranges are also possible.

According to some embodiments, the electrochemical cell comprises an electrolyte. The electrolytes used in electrochemical cells can function as a medium for the storage and transport of ions, and in the special case of solid electrolytes and gel electrolytes, these materials may additionally function as a separator between the anode and the cathode. Any liquid, solid, or gel material capable of storing and transporting ions may be used, so long as the material facilitates the transport of ions (e.g., Li ions) between the anode and the cathode. The electrolyte is generally electronically non-conductive to prevent short circuiting between the anode and the cathode. The electrolyte can comprise one or more ionic electrolyte salts to provide ionic conductivity and one or more liquid electrolyte solvents, gel polymer materials, or polymer materials. Suitable non-aqueous electrolytes may include organic electrolytes comprising one or more materials selected from the group consisting of liquid electrolytes, gel polymer electrolytes, and solid polymer electrolytes.

In some cases, the electrochemical chemical cell comprises a liquid electrolyte. In some embodiments, the electrolyte includes a non-aqueous electrolyte. Suitable non-aqueous electrolytes may include organic electrolytes such as liquid electrolytes, gel polymer electrolytes, and solid polymer electrolytes. These electrolytes may optionally include one or more ionic electrolyte salts (e.g., to provide or enhance ionic conductivity). Examples of useful non-aqueous liquid electrolyte solvents include, but are not limited to, non-aqueous organic solvents, such as, for example, N-methyl acetamide, acetonitrile, acetals, ketals, esters (e.g., esters of carbonic acid), carbonates (e.g., dimethyl carbonate, diethyl carbonate, ethyl methyl carbonate, propylene carbonate, ethylene carbonate, fluoroethylene carbonate, difluoroethylene carbonate), sulfones, sulfites, sulfolanes, suflonimidies (e.g., bis(trifluoromethane)sulfonimide lithium salt), aliphatic ethers, acyclic ethers, cyclic ethers, glymes, polyethers, phosphate esters (e.g., hexafluorophosphate), siloxanes, dioxolanes, N-alkylpyrrolidones, nitrate containing compounds, substituted forms of the foregoing, and blends thereof. Examples of acyclic ethers that may be used include, but are not limited to, diethyl ether, dipropyl ether, dibutyl ether, dimethoxymethane, trimethoxymethane, 1,2-dimethoxyethane, diethoxyethane, 1,2-dimethoxypropane, and 1,3-dimethoxypropane. Examples of cyclic ethers that may be used include, but are not limited to, tetrahydrofuran, tetrahydropyran, 2-methyltetrahydrofuran, 1,4-dioxane, 1,3-dioxolane, and trioxane. Examples of polyethers that may be used include, but are not limited to, diethylene glycol dimethyl ether (diglyme), triethylene glycol dimethyl ether (triglyme), tetraethylene glycol dimethyl ether (tetraglyme), higher glymes, ethylene glycol divinyl ether, diethylene glycol divinyl ether, triethylene glycol divinyl ether, dipropylene glycol dimethyl ether, and butylene glycol ethers. Examples of sulfones that may be used include, but are not limited to, sulfolane, 3-methyl sulfolane, and 3-sulfolene. Fluorinated derivatives of the foregoing are also useful as liquid electrolyte solvents. In some cases, mixtures of the solvents described herein may also be used.

In some cases, aqueous solvents can be used for electrolytes for lithium cells. Aqueous solvents can include water, which can contain other components such as ionic salts. As noted above, in some embodiments, the electrolyte can include species such as lithium hydroxide, or other species rendering the electrolyte basic, so as to reduce the concentration of hydrogen ions in the electrolyte.

In certain embodiments, the electrochemical cell comprises gel electrolyte. Examples of useful gel polymer electrolytes include, but are not limited to, those comprising one or more polymers selected from the group consisting of polyethylene oxides, polypropylene oxides, polyacrylonitriles, polysiloxanes, polyimides, polyphosphazenes, polyethers, sulfonated polyimides, perfluorinated membranes (NAFION resins), polydivinyl polyethylene glycols, polyethylene glycol diacrylates, polyethylene glycol dimethacrylates, derivatives of the foregoing, copolymers of the foregoing, crosslinked and network structures of the foregoing, and blends of the foregoing, and optionally, one or more plasticizers. In some embodiments, a gel polymer electrolyte comprises between 10-20%, 20-40%, between 60-70%, between 70-80%, between 80-90%, or between 90-95% of a heterogeneous electrolyte by volume.

According to certain embodiments, the electrochemical cell comprises solid electrolyte. For example, in some embodiments, one or more solid polymers can be used to form an electrolyte. Examples of useful solid polymer electrolytes include, but are not limited to, those comprising one or more polymers selected from the group consisting of polyethers, polyethylene oxides, polypropylene oxides, polyimides, polyphosphazenes, polyacrylonitriles, polysiloxanes, derivatives of the foregoing, copolymers of the foregoing, crosslinked and network structures of the foregoing, and blends of the foregoing.

In addition to electrolyte solvents, gelling agents, and polymers as known in the art for forming electrolytes, the electrolyte may further comprise one or more ionic electrolyte salts, also as known in the art, to increase the ionic conductivity.

In some embodiments, the electrolyte comprises at least one lithium salt. For example, in some cases, the at least one lithium salt is selected from the group consisting of LiSCN, LiBr, LiI, $LiSO_3CH_3$, $LiNO_3$, $LiPF_6$, $LiBF_4$, $LiB(Ph)_4$, $LiClO_4$, $LiAsF_6$, $Li_2SiF_6$, $LiSbF_6$, $LiAlCl_4$, lithium bisoxalatoborate, $LiCF_3SO_3$, $LiN(SO_2F)_2$, $LiC(CnF_{2n+1}SO_2)_3$, wherein n is an integer in the range of from 1 to 20, and $(C_nF_{2n+1}SO_2)_mXLi$ with n being an integer in the range of from 1 to 20, m being 1 when X is selected from oxygen or sulfur, m being 2 when X is selected from nitrogen or phosphorus, and m being 3 when X is selected from carbon or silicon.

In some embodiments, an electrochemical cell includes a separator. The separator generally comprises a polymeric material (e.g., polymeric material that does or does not swell upon exposure to electrolyte). In some embodiments, the separator is located between the electrolyte and an electrode (e.g., a first electrode, a second electrode, an anode, a cathode). The separator can be configured to inhibit (e.g., prevent) physical contact between a first electrode and a second electrode, which could result in short circuiting of the electrochemical cell. The separator can be configured to be substantially electronically non-conductive, which can inhibit the degree to which the separator causes short circuiting of the electrochemical cell.

Example 1

The following example describes the formation and characterization of passivation layers on alkali metals by reacting Li with $N_2O$.

The alkali metal electrodes were prepared for targeted reactions in an argon glovebox by a series of mechanical polishing and rolling steps to express clean alkali metal surfaces. The alkali metal electrodes were then punched to a pre-determined size and loaded into an airtight reaction vessel under an inert argon environment. The vessel was purged with a reactant gas desired to impart the targeted properties to the alkali metal electrode, and then pressured to a desired value (typically near-atmospheric pressure). The vessel was then placed within an oven or furnace, or simply placed onto a hot plate, and temperature and reaction time were monitored. Following the end of the reaction, the vessel was actively or passively cooled, then purged with Ar to remove the reactant gas prior to opening. Passivation layers were formed on a layer of Li by reacting the Li with $N_2O$ to form the passivation layer comprising $Li_2O$ on the Li metal. The performance of the Li metal electrodes comprising passivation layers were tested in electrochemical cells.

Figure 5B:
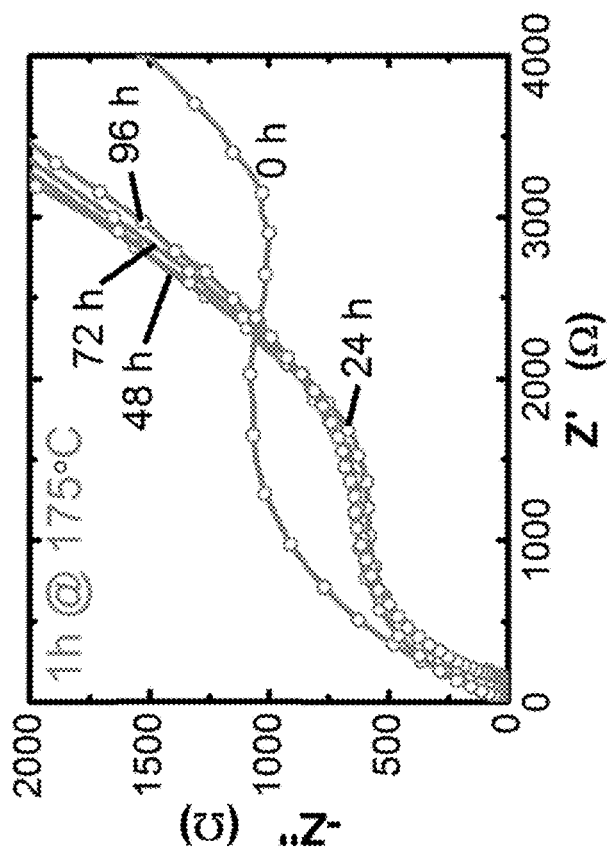
FIG. 5B shows, according to certain embodiments, a Nyquist plot EIS measurements of a symmetric cell using Li reacted with $NF_3$ at 175° C.
Figure 5A:
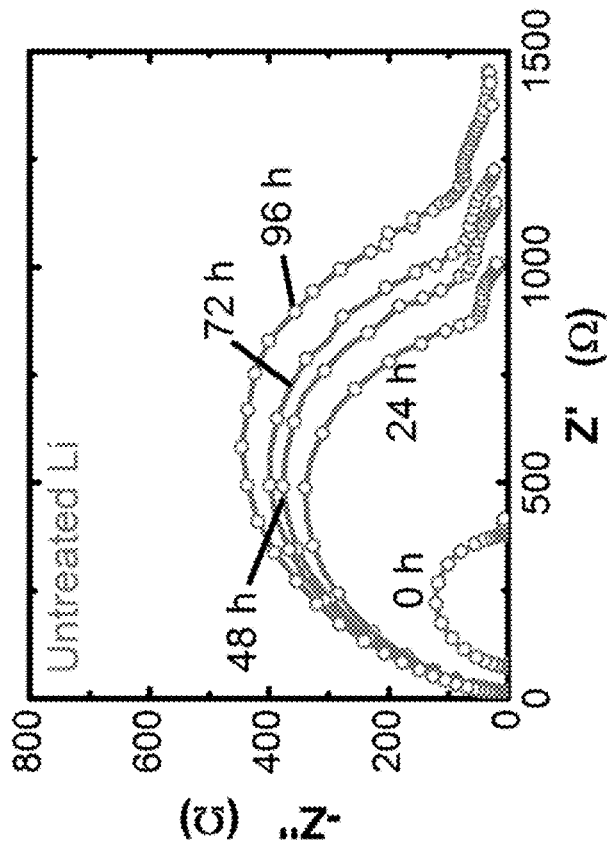
FIG. 5A shows, according to certain embodiments, a Nyquist plot of electrochemical impedance spectroscopy (EIS) measurements of a symmetric cell using Li.
Figure 6:
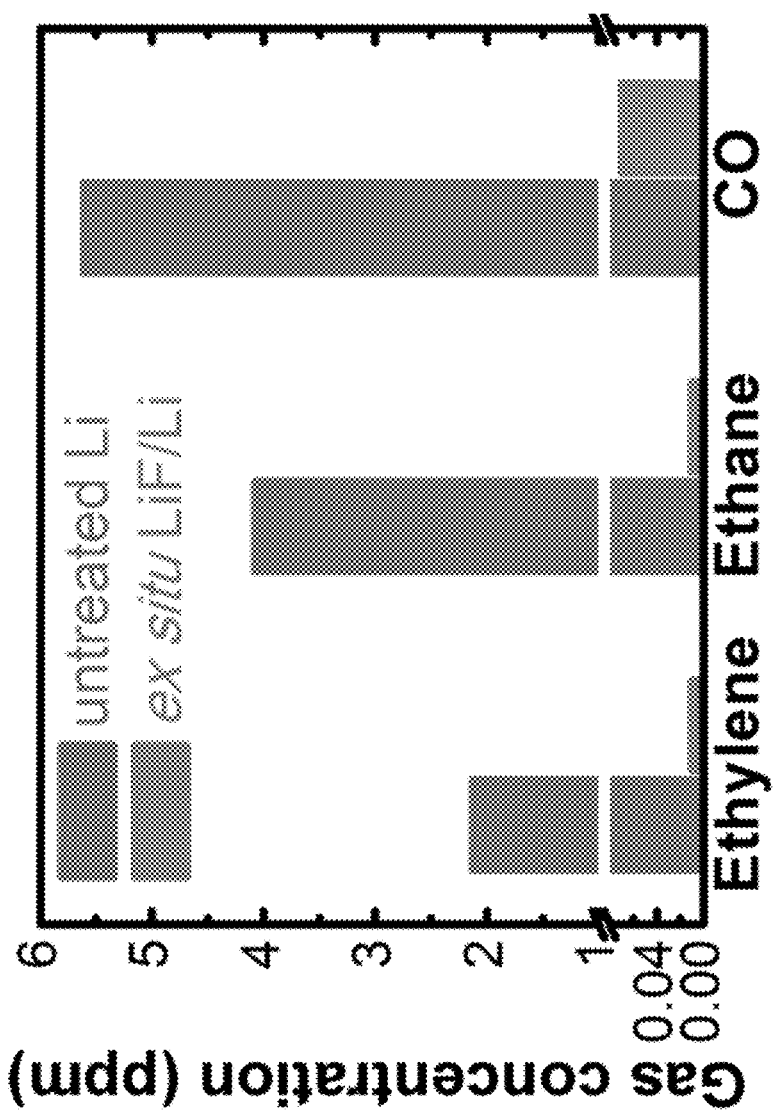
FIG. 6 shows, according to certain embodiments, the gas evolution of Li soaked in electrolyte compared to Li treated with $NF_3$ for 1 hour at 175° C. soaked in electrolyte.
Figure 7C:
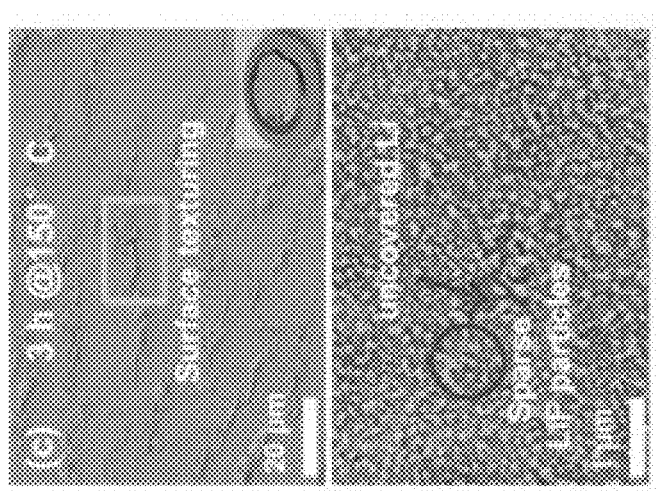
FIG. 7C shows, according to some embodiments, a SEM image of Li reacted with $NF_3$ for 3 hours at 150° C.
Figure 7B:
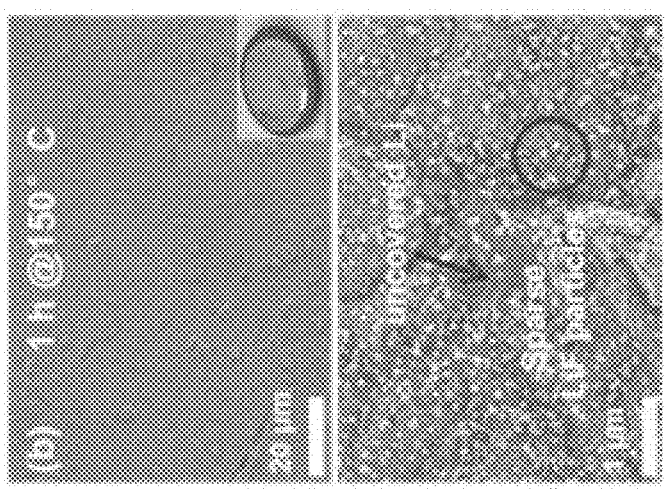
FIG. 7B shows, according to some embodiments, a SEM image of Li reacted with $NF_3$ for 1 hour at 150° C.
Figure 7A:
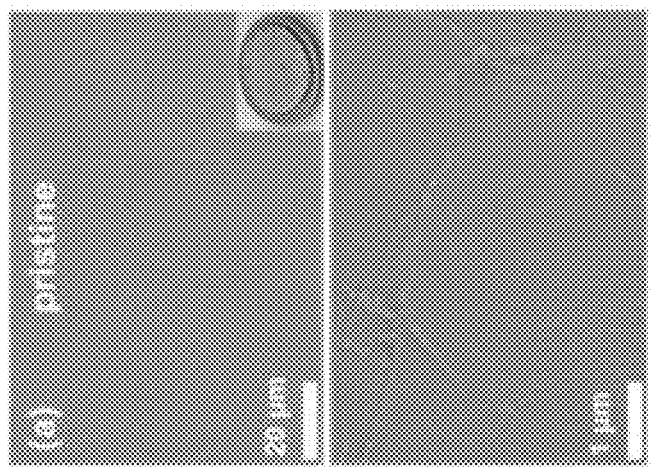
FIG. 7A shows, according to certain embodiments, a scanning electron microscopy (SEM) image of Li.
Figure 7E:
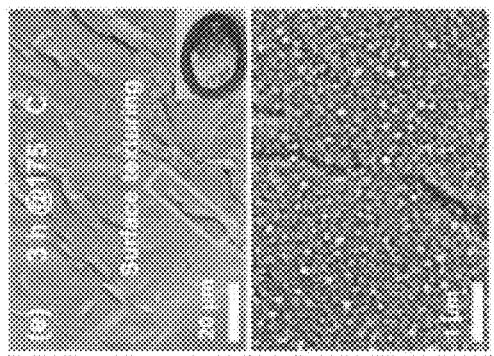
FIG. 7E shows, according to certain embodiments, a SEM image of Li reacted with $NF_3$ for 3 hours at 175° C.
Figure 7G:
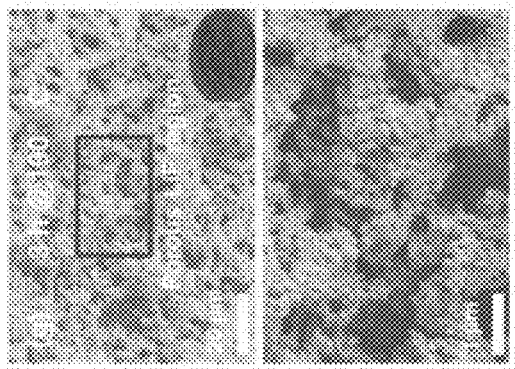
FIG. 7G shows, according to certain embodiments, a SEM image of Li reacted with $NF_3$ for 3 hours at 190° C.
Figure 7D:
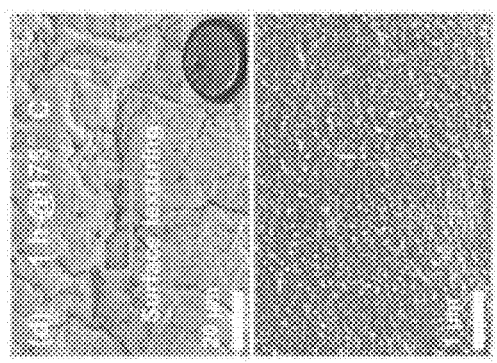
FIG. 7D shows, according to certain embodiments a SEM image of Li reacted with $NF_3$ for 1 hour at 175° C.
Figure 7F:
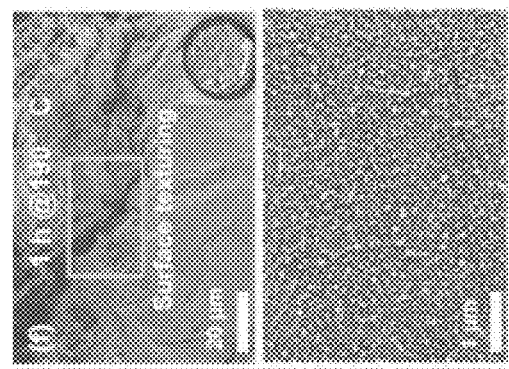
FIG. 7F shows, according to certain embodiments, a SEM image of Li reacted with $NF_3$ for 1 hour at 190° C.
Figure 8:
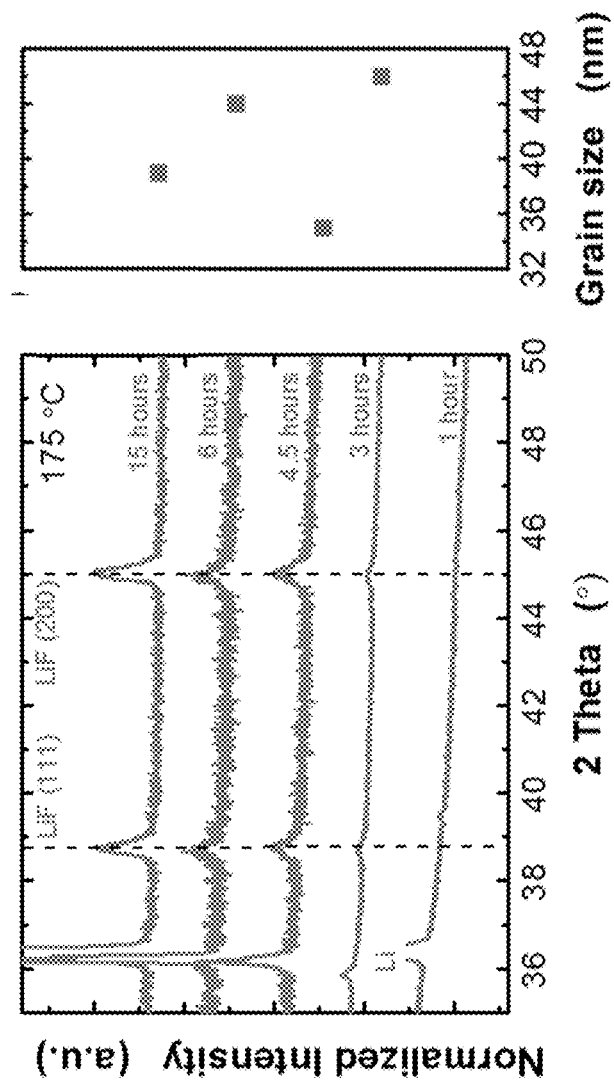
FIG. 8 shows, according to certain embodiments, a X-ray diffraction (XRD) spectrum of Li reacted with $NF_3$ for various reaction times at 175° C. and the corresponding average grain size in each sample.
Figure 13B:
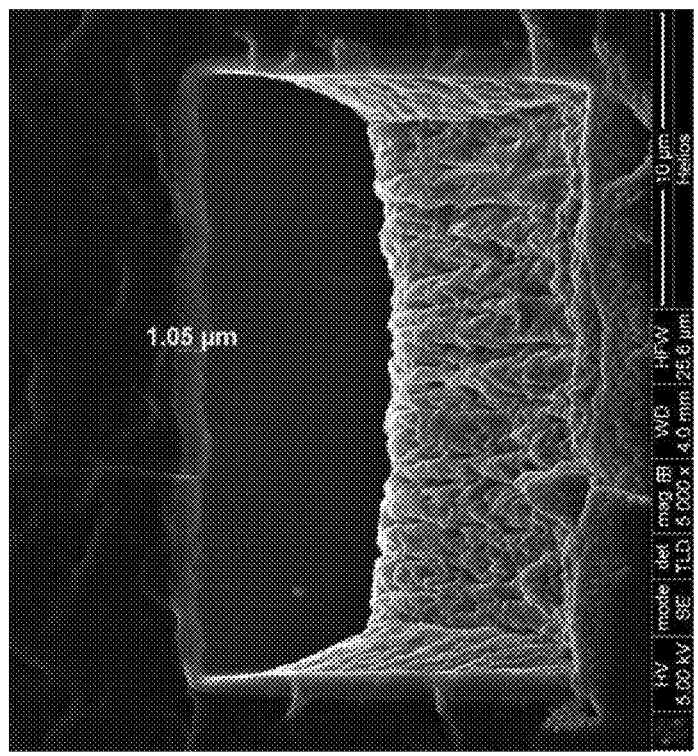
FIG. 13B shows, according to certain embodiments, a tilted-view focused ion beam SEM image of Li treated with $N_2O$ at 175° C. for 24 hours.
Figure 13A:
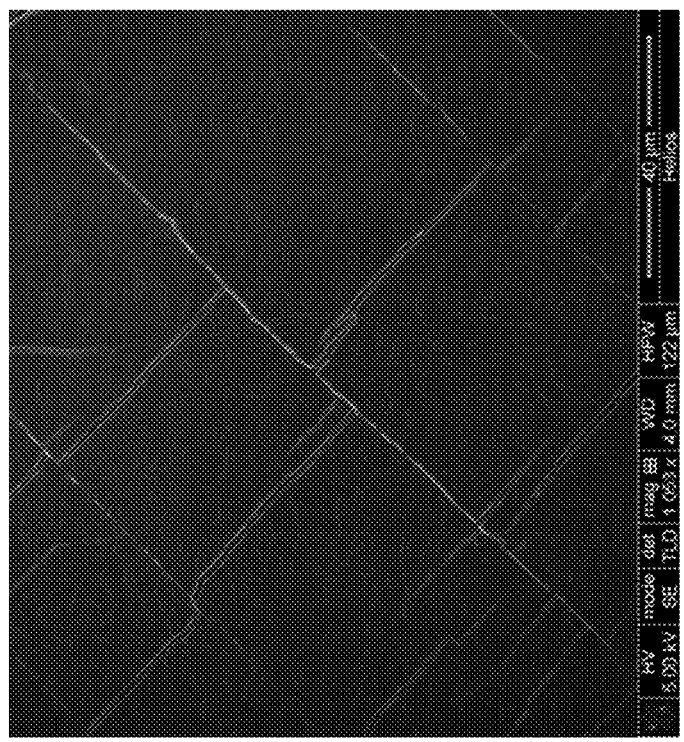
FIG. 13A shows, according to certain embodiments, a top-view focused ion beam SEM image of Li treated with $N_2O$ at 175° C. for 24 hours.
Figure 14:
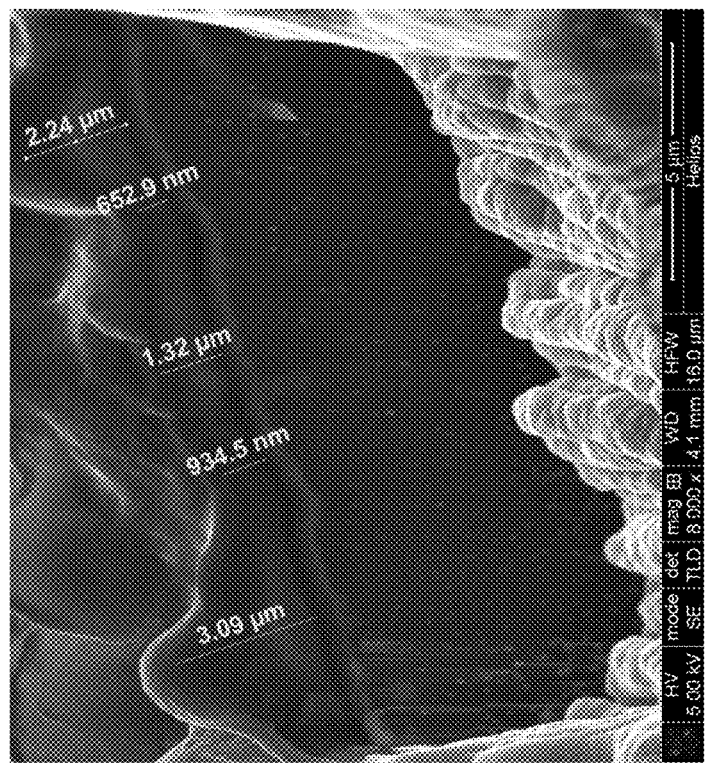
FIG. 14 shows, according to certain embodiments, a focused ion beam SEM image of Li treated with $N_2O$ for 24 hours at 200° C.
Figure 15:
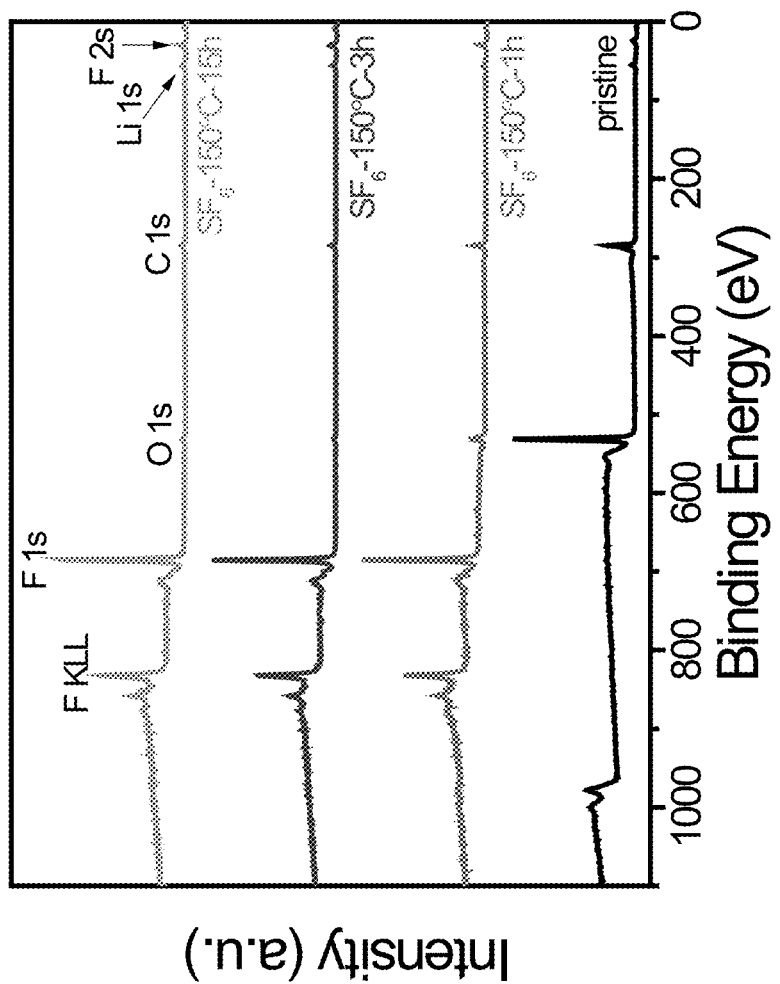
FIG. 15 shows, according to certain embodiments, XPS spectra of Li reacted with $SF_6$ at various temperatures and for various reaction times.
Figure 16A:
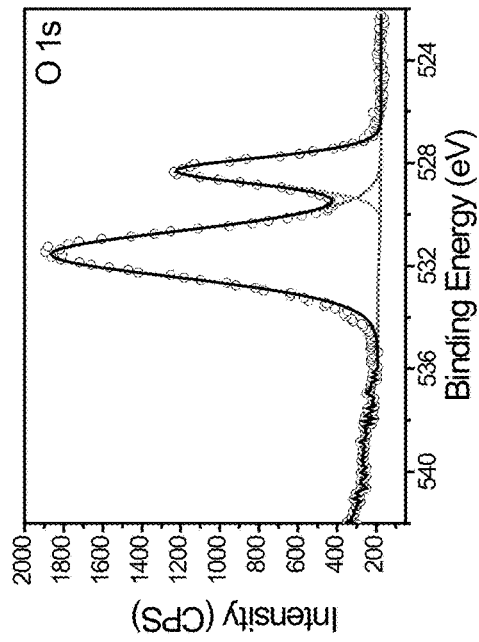
FIG. 16A shows, according to certain embodiments, a high resolution C 1s XPS spectrum of Li reacted with $SF_6$ at 150° C. for 1 hour.
Figure 16B:
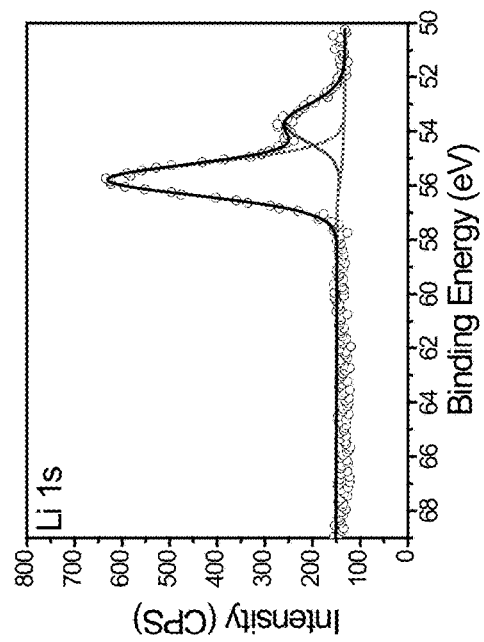
FIG. 16B shows, according to certain embodiments, a high resolution O 1s XPS spectrum of Li reacted with $SF_6$ at 150° C. for 1 hour.
Figure 16C:
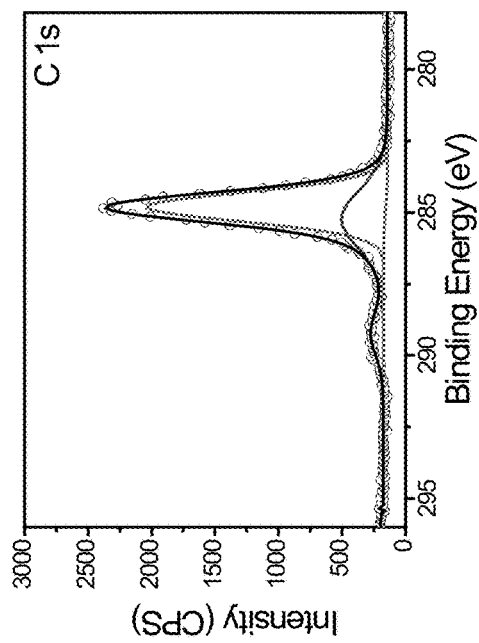
FIG. 16C shows, according to certain embodiments, a high resolution F 1s XPS spectrum of Li reacted with $SF_6$ at 150° C. for 1 hour.
Figure 16D:
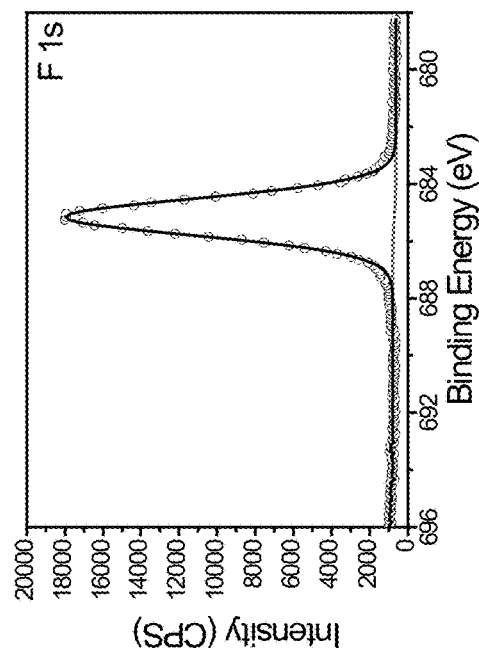
FIG. 16D shows, according to certain embodiments, a high resolution Li 1s XPS spectrum of Li reacted with $SF_6$ at 150° C. for 1 hour.
Figure 17:
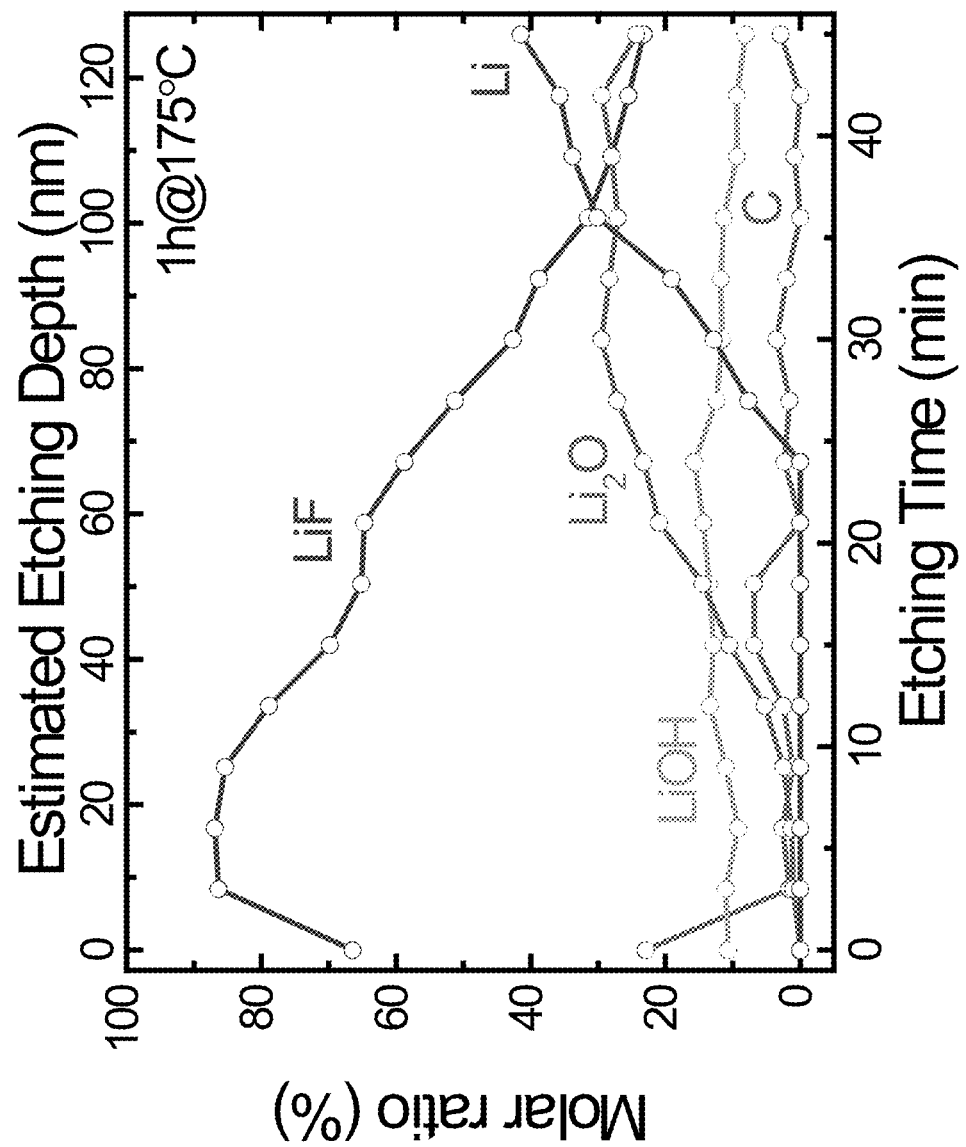
FIG. 17 shows, according to certain embodiments, calculated molar ratios of different surface chemical species, after etching, of Li reacted with $NF_3$ at 175° C. for 1 hour.
Figure 18D:
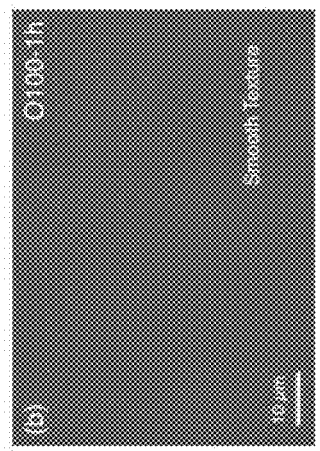
FIG. 18D shows, according to certain embodiments, a cross-sectional SEM image of Li reacted with $O_2$ at 100° C. for 1 hour.
Figure 18E:
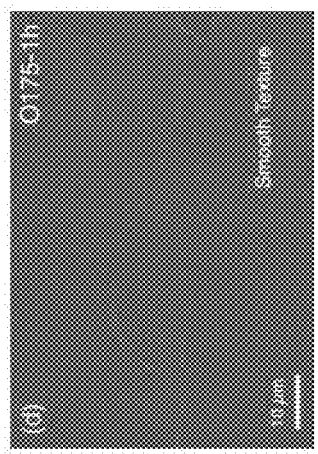
FIG. 18E shows, according to certain embodiments, a cross-sectional SEM image of Li reacted with $O_2$ at 175° C. for 1 hour.
Figure 18F:
FIG. 18F shows, according to certain embodiments, a cross-sectional SEM image of Li reacted with $O_2$ at 250° C. for 1 hour.
Figure 18A:
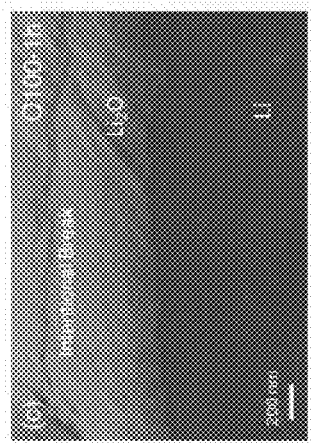
FIG. 18A shows, according to certain embodiments, a top-view SEM image of Li reacted with $O_2$ at 100° C. for 1 hour.
Figure 18B:
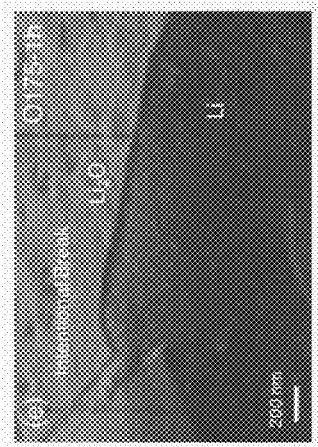
FIG. 18B shows, according to certain embodiments, a top-view SEM image of Li reacted with $O_2$ at 175° C. for 1 hour.
Figure 18C:
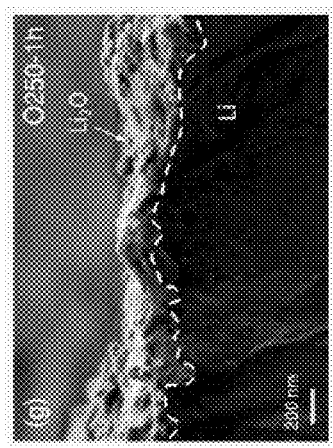
FIG. 18C shows, according to certain embodiments, a top-view SEM image of Li reacted with $O_2$ at 250° C. for 1 hour.

More specifically, $N_2O$ was reacted with Li surfaces under temperatures ranging from below the melting temperature of Li (e.g., less than 180.5° C.) to above the melting-temperature of Li (e.g., molten conditions). When reacted below the melting temperature (e.g., 175° C.), XPS shows that only oxygen, and no nitrogen, was incorporated into the passivation layer. SEM images indicate the passivation layer to be conformal, with a thickness of up to 1 micrometer for reactions of 24 hours (see, for example, FIGS. 13A-13B, FIG. 14). Shorter reaction times yield thinner layers. Upon air exposure, the $N_2O$-reacted electrodes do not visibly react or discolor, whereas untreated electrodes rapidly discolor and blacken, indicating the effectiveness of the formed $Li_2O$ barrier. At higher reaction temperatures (e.g., 200° C.) and similar reaction times (e.g., 24 hours), the resulting passivation layer had visible cracks, indicating that specific reaction conditions, such as temperature and time, have a significant impact over the resulting film integrity.

evolved nitrogen during the reaction was non-reactive towards the Li and instead appears to escape as a gas product. The molar percent ratio of species was evaluated as a function of estimated etching depth, using XPS for Li reacted with NF3 at 175° C. for 1 hour (see, for example, FIG. 17). The atomic composition of the passivation layers formed by reacting Li metal with $NF_3$ for various reaction times is shown in Table 1. Furthermore, XRD indicated that the LiF films are crystalline. SEM images of Li were also compared to Li reacted with $NF_3$ for various reaction times at various temperatures, as shown in FIGS. 7A-7G. The chemical stability of Li and Li reacted with $NF_3$ at 175° C. towards electrolyte was compared using electrochemical impedance spectroscopy (see, for example, FIGS. 5A-5B) and gas analysis methods (see FIG. 6). Improved chemical stability of Li with the LiF passivation layer towards electrolyte was observed.

Figure 9A:
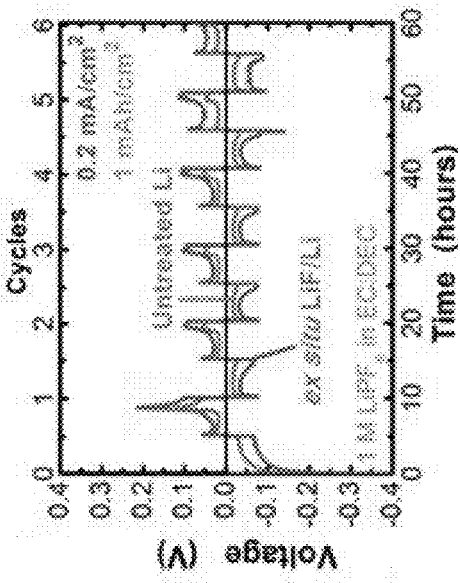
FIG. 9A shows, according to certain embodiments, galvanostatic cycling of cells using Li and ex situ LiF/Li in the onset of the first half cycle.
Figure 9B:
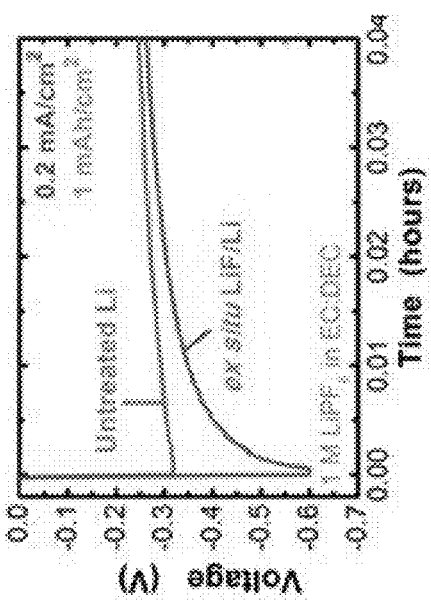
FIG. 9B shows, according to certain embodiments, galvanostatic cycling of cells using Li and ex situ LiF/Li in the first several cycles.
Figure 9C:
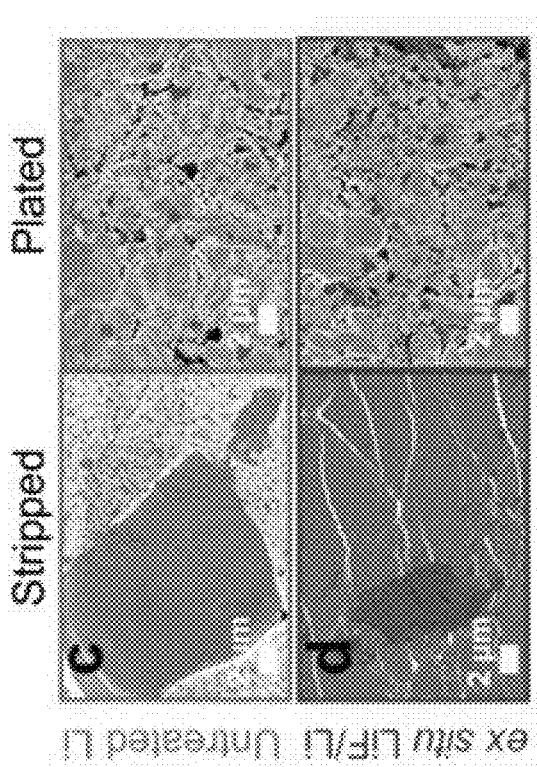
FIG. 9C shows, according to certain embodiments, top-view SEM images of electrodes at the end of the first half cycle of galvanostatic cycling.
Figure 9E:
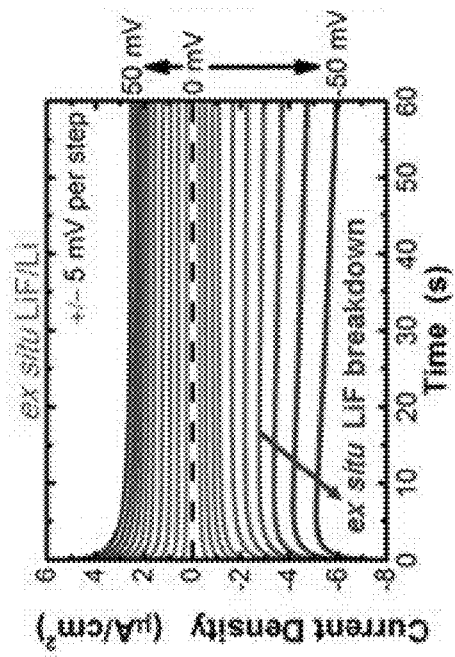
FIG. 9E shows, according to certain embodiments, chronoamperometry of cells using ex situ LiF/Li.
Figure 9D:
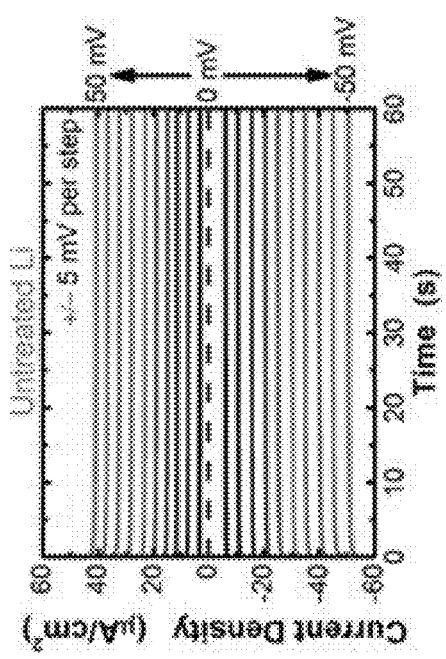
FIG. 9D shows, according to certain embodiments, chronoamperometry of cells using Li.
Figure 9F:
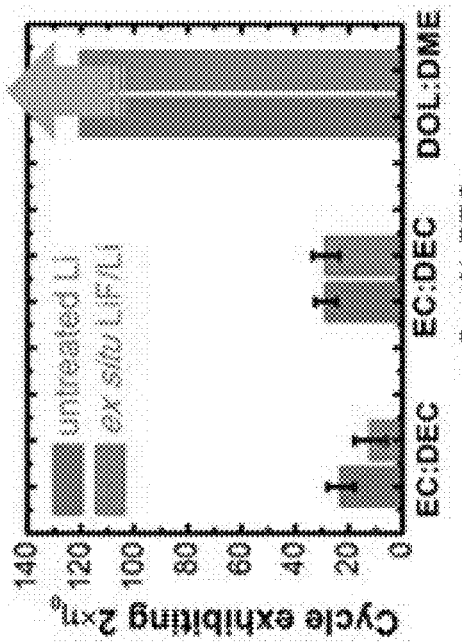
FIG. 9F shows, according to certain embodiments, the cell cycle number in which the overpotential doubles compared to the initial reference overpotential in different electrolytes.
Figure 10A:
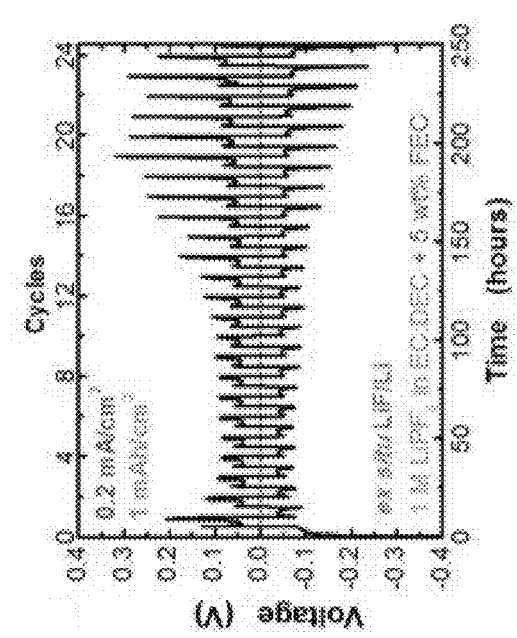
FIG. 10A shows, according to certain embodiments, a galvanostatic cycling curve of cells using Li in 1 M $LiPF_6$ in EC/DEC+5 w.t. % FEC electrolyte.
Figure 10B:
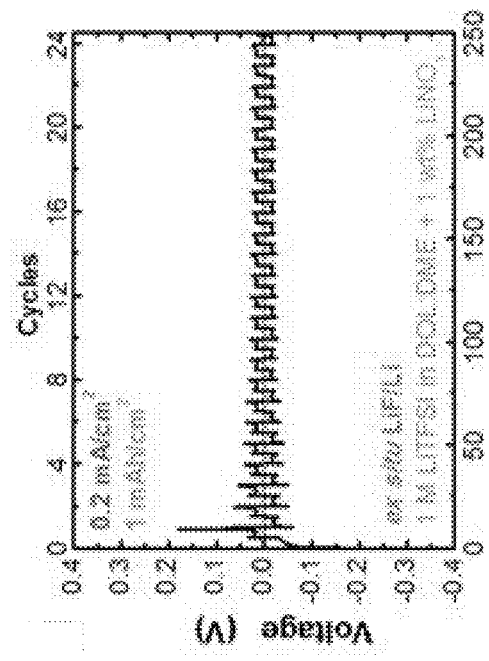
FIG. 10B shows, according to certain embodiments, a galvanostatic cycling curve of cells using ex situ LiF/Li in 1 M $LiPF_6$ in EC/DEC+5 w.t. % FEC electrolyte.
Figure 10C:
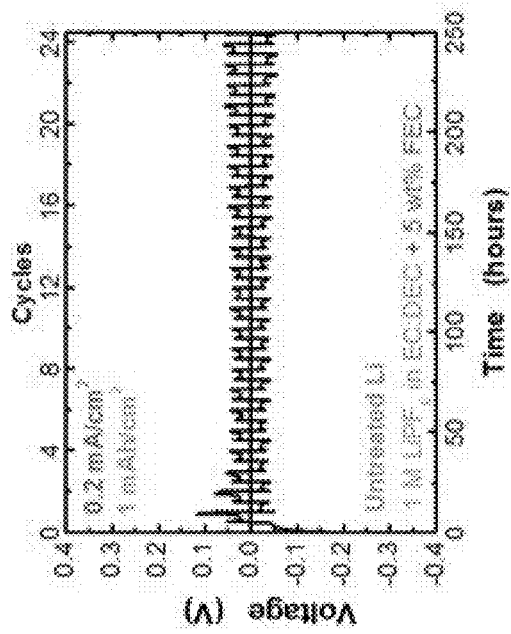
FIG. 10C shows, according to certain embodiments, a galvanostatic cycling curve of cells using Li in 1 M LiTFSI in DOL/DME+1 w.t. % $LiNO_3$ electrolyte.
Figure 10D:
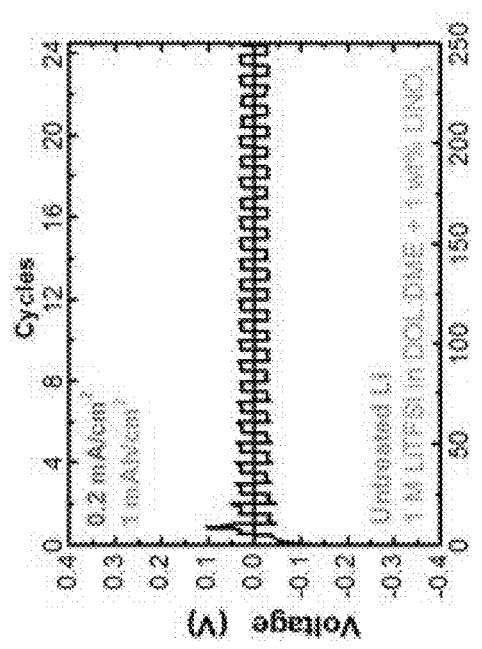
FIG. 10D shows, according to certain embodiments, a galvanostatic cycling curve of cells using ex situ LiF/Li in 1 M LiTFSI in DOL/DME+1 w.t. % $LiNO_3$ electrolyte.
Figure 11E:
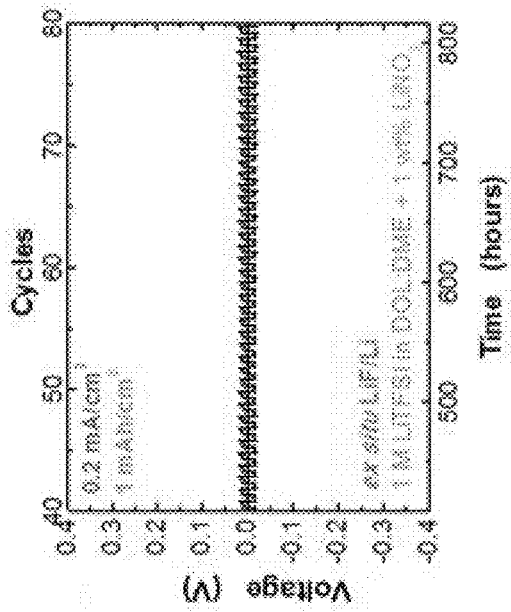
FIG. 11E shows, according to certain embodiments, galvanostatic cycling of cells using ex situ LiF/Li showing cycles 40-80.
Figure 11D:
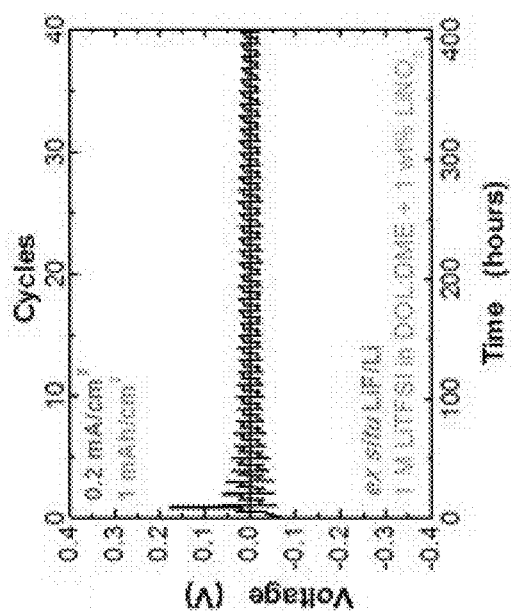
FIG. 11D shows, according to certain embodiments, galvanostatic cycling of cells using ex situ LiF/Li showing cycles 1-40.
Figure 11F:
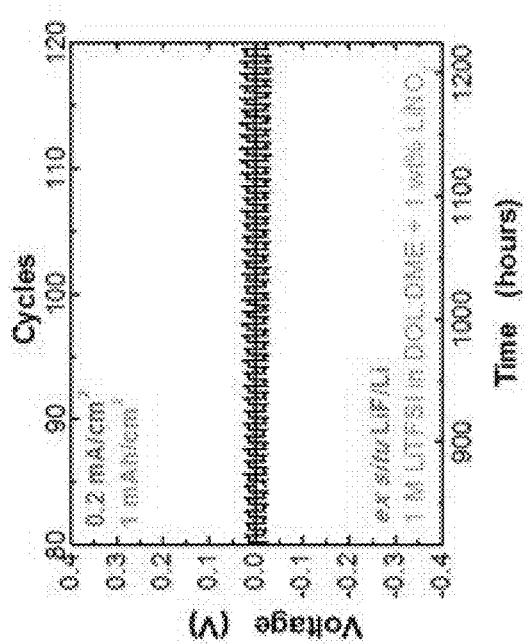
FIG. 11F shows, according to certain embodiments, galvanostatic cycling of cells using ex situ LiF/Li showing cycles 80-120.
Figures 12A, 12B:
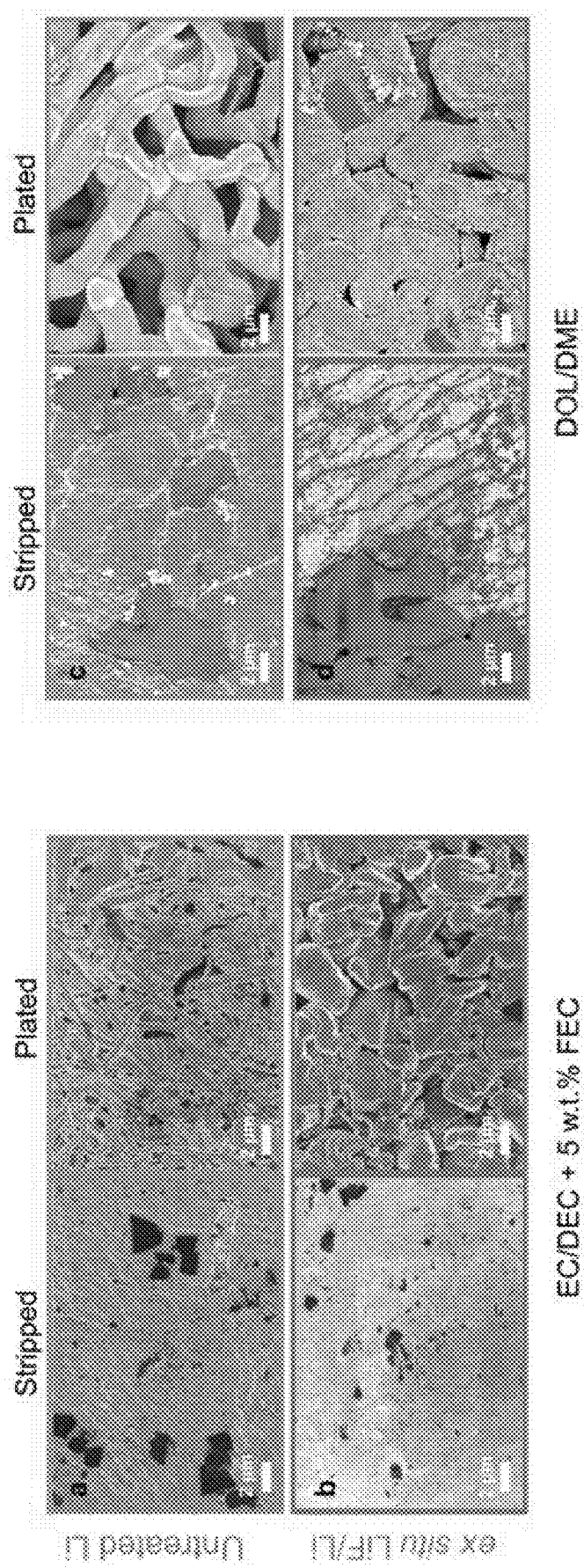
FIG. 12A shows, according to certain embodiments, top-view SEM images of electrodes in cells using Li in 1 M $LiPF_6$ and ex situ LiF/Li in 1 M $LiPF_6$ at the end of the first half cycle.
FIG. 12B shows, according to certain embodiments, top-view SEM images of electrodes in cells using Li in 1 M LiTFSI and ex situ LiF/Li in 1 M LiTFSI at the end of the first half cycle.

To test the electrochemical behavior of these films, galvanostatic cycling was conducted in which constant current (typically 0.2 mA/cm$^2$) was applied to Li—Li symmetric cells in different electrolytes. See, for example, FIGS. 9A-9B, FIGS. 10A-10D, and FIGS. 11A-11F. The resulting electrode performance was compared in FIG. 9F, showing comparable electrode cycle life in certain electrolytes. The electrode morphologies after the first half cycle in these cells were also examined. See, for example, FIG. 9C and FIGS. 12A-12B. In addition, chronoamperometry of cells using untreated Li was compared to cells using Li with an LiF passivation layer (see, for example, FIGS. 9D-9E).

TABLE 1

The atomic composition of various passivation layers formed by reacting Li metal with $NF_3$ for between one to fifteen hours, compared to pristine Li.

| Sample | Reaction Temp (° C.) | Reaction Time (hr) | Li At. %/Mol. % | F At. %/Mol. % | O At. %/Mol. % | C At. %/Mol. % | N At. %/Mol. % |
|---|---|---|---|---|---|---|---|
| Pristine Li | — | — | 29.5 | 0 | 43.2 | 27.3 | 0 |
| Li reacted with $NF_3$ | 150 | 1 | 30.6 | 28.6 | 8.0 | 32.8 | 0 |
| Li reacted with $NF_3$ | 150 | 3 | 46.7 | 47.1 | 1.4 | 4.8 | 0 |
| Li reacted with $NF_3$ | 150 | 6 | 46.6 | 52.7 | 0.7 | 0 | 0 |
| Li reacted with $NF_3$ | 150 | 15 | 46.4 | 50.8 | 0.9 | 1.9 | 0 |

Example 2

The following example describes the formation and characterization of passivation layers on alkali metals by reacting Li with $NF_3$.

Reactions of Li with $NF_3$ were conducted over a range of temperatures, but focused predominantly on reactions below the melting temperature of the alkali metal. Upon air exposure, the $NF_3$-reacted electrodes do not visibly react or discolor, whereas untreated electrodes rapidly discolor and blacken, indicating the effectiveness of the formed LiF barrier. XPS and XRD data of Li was compared to Li reacted with $NF_3$ for various reaction times at various temperatures, as shown in FIG. 3, FIGS. 4A-4D, and FIG. 8. At 175° C., for example, the resulting passivation layers were found by XPS to contain only LiF and no $Li_3N$, indicating that the Example 3

The following example describes the formation and characterization of passivation layers on alkali metals by reacting Li with $SF_6$.

Reactions between $SF_6$ and Li result in apparently pure LiF layers, Li treated at 150° C. under $SF_6$ for several hours exhibited a metallic finish and appeared non-reactive towards the ambient. Furthermore, XPS results indicated the formation of only LiF and no incorporated S (see, for example, FIG. 15, FIGS. 16A-16D). The atomic composition of the passivation layers formed by reacting Li metal with $SF_6$ for various reaction times is shown in Table 2.

TABLE 2

The atomic composition of various passivation layers formed by reacting Li metal with SF$_6$ for between 1 to 15 hours, compared to pristine Li.

| Sample | Reaction Temp (° C.) | Reaction Time (hr) | Li At. %/ Mol. % | F At. %/ Mol. % | O At. %/ Mol. % | C At. %/ Mol. % | S At. %/ Mol. % |
|---|---|---|---|---|---|---|---|
| Pristine Li | — | — | 29.5 | 0 | 43.2 | 27.3 | 0 |
| Li reacted with SF$_6$ | 150 | 1 | 37.5 | 47.1 | 8.8 | 12.5 | 0 |
| Li reacted with SF$_6$ | 150 | 3 | 46.4 | 47.5 | 1.3 | 4.9 | 0 |
| Li reacted with SF$_6$ | 150 | 15 | 45.6 | 46.3 | 1.9 | 6.2 | 0 |

Example 4

The following example describes the formation and characterization of passivation layers on alkali metals by reacting Li with O$_2$.

Figures 19A, 19B:
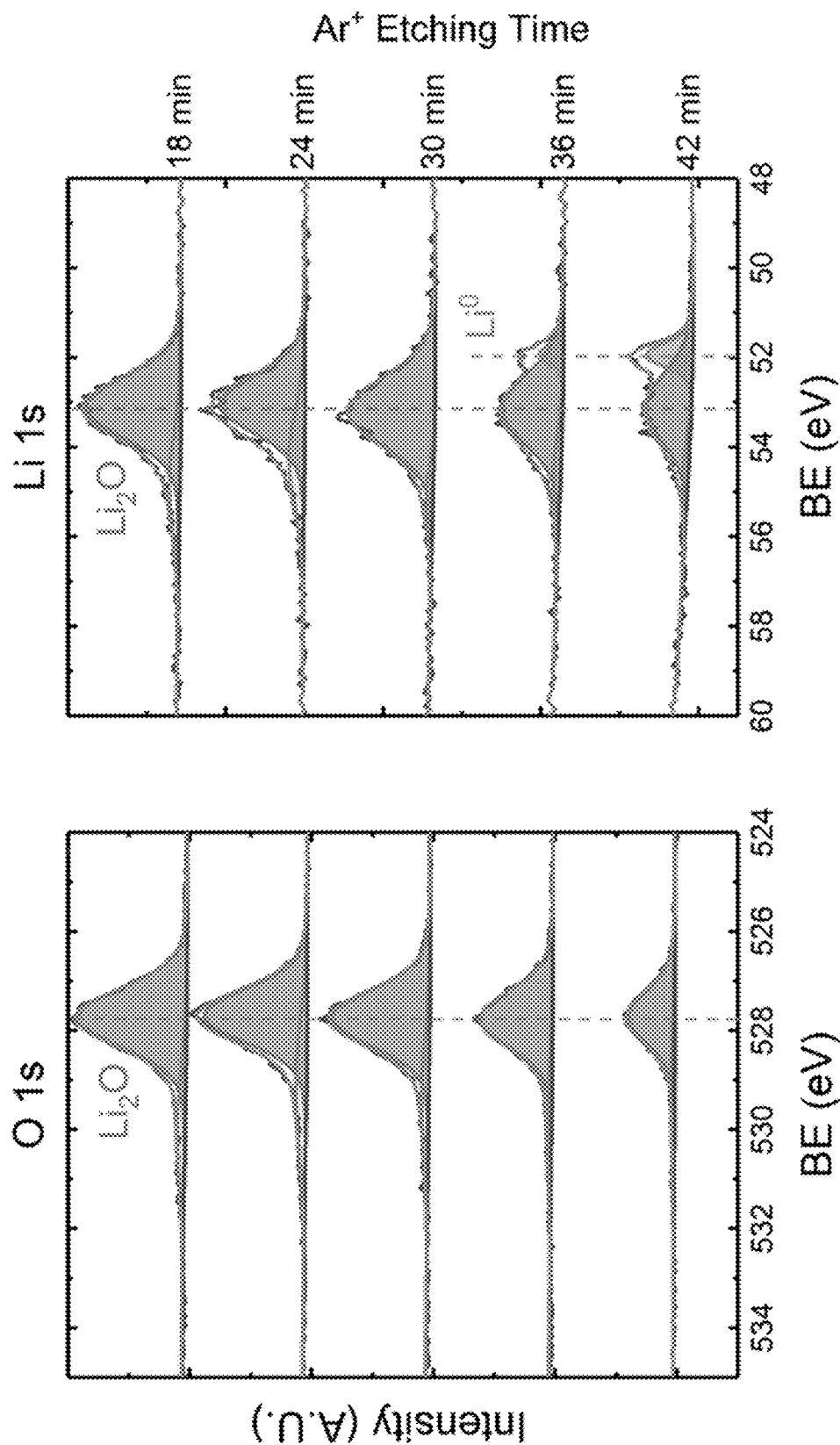
FIG. 19A shows, according to certain embodiments, a O 1s XPS depth profile of Li reacted with $O_2$ at 250° C. for 1 hour.
FIG. 19B shows, according to certain embodiments, a Li 1s XPS depth profile of Li reacted with $O_2$ at 250° C. for 1 hour.
Figure 20:
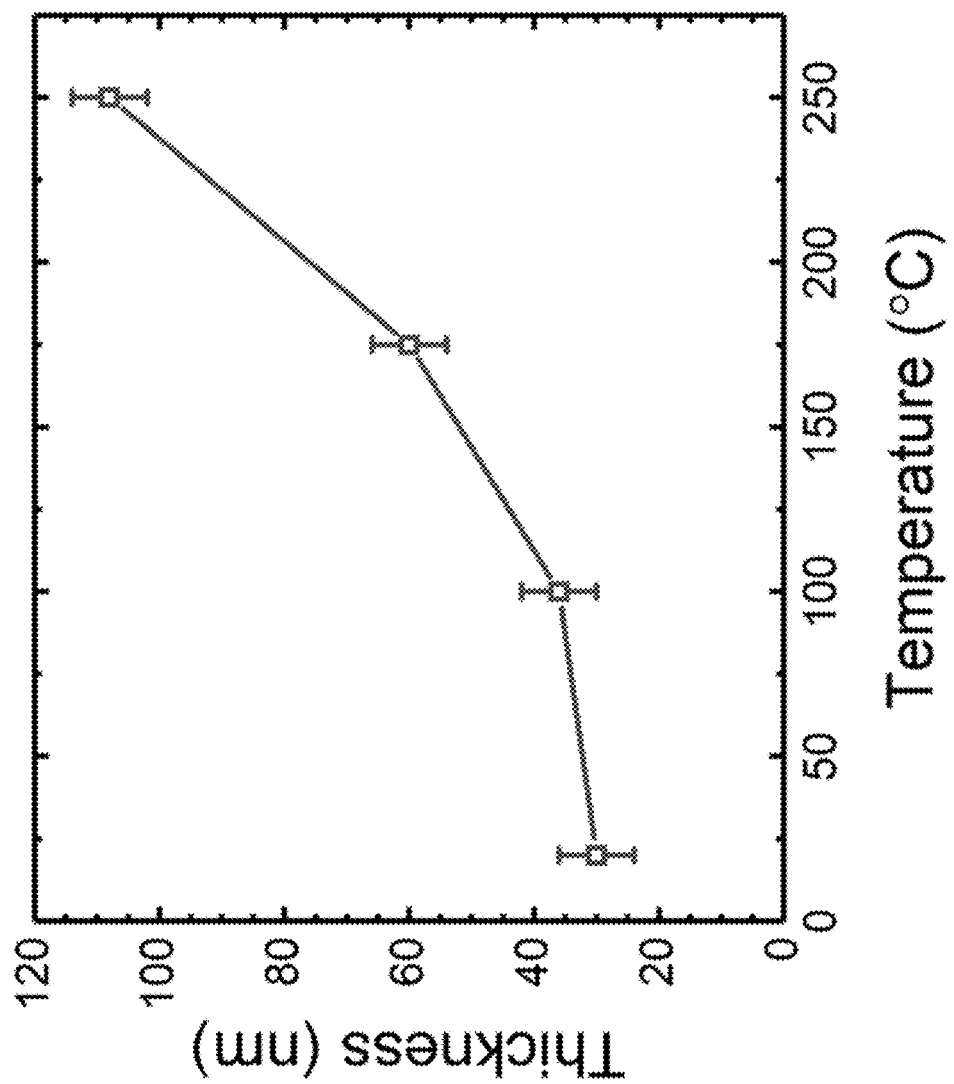
FIG. 20 shows, according to certain embodiments, a plot of the $Li_2O$ surface layer thickness estimated by XPS depth profile as a function of the temperature of the reaction of Li with $O_2$.
Figure 21A:
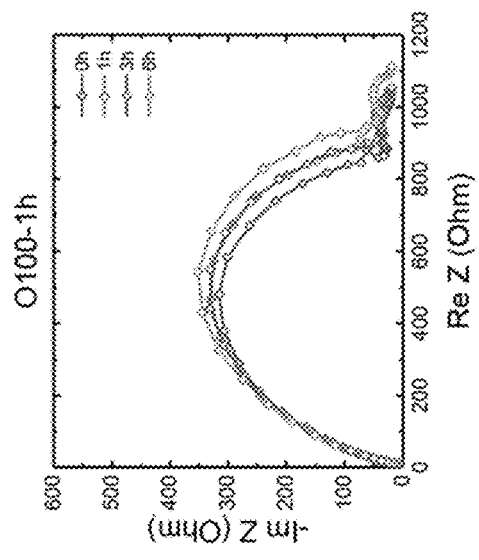
FIG. 21A shows, according to certain embodiments, a Nyquist plot of EIS measurements of cells using Li reacted with $O_2$ at 20° C. for 1 hour.
Figure 21B:
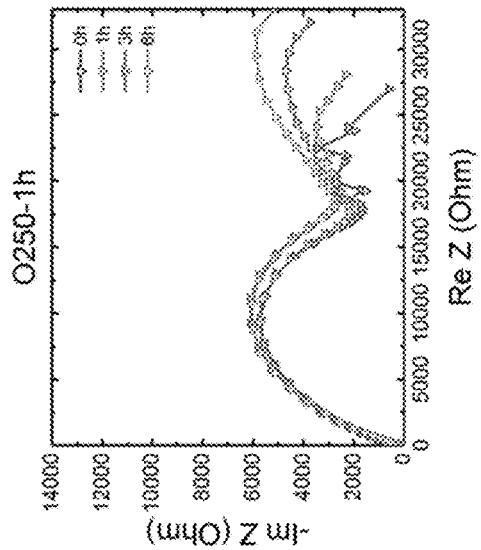
FIG. 21B shows, according to certain embodiments, a Nyquist plot of EIS measurements of cells using Li reacted with $O_2$ at 100° C. for 1 hour.
Figure 21C:
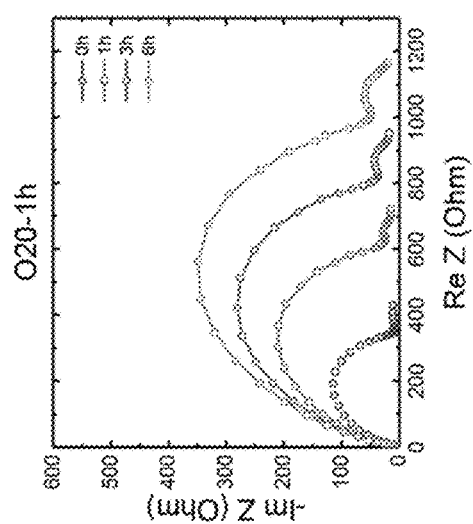
FIG. 21C shows, according to certain embodiments, a Nyquist plot of EIS measurements of cells using Li reacted with $O_2$ at 175° C. for 1 hour.
Figure 21D:
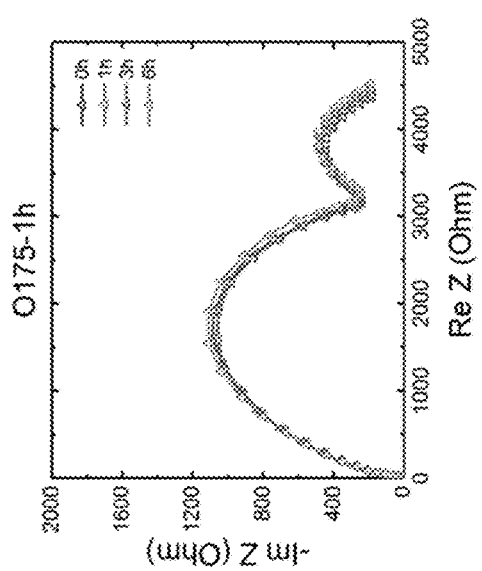
FIG. 21D shows, according to certain embodiments, a Nyquist plot of EIS measurements of cells using Li reacted with $O_2$ at 250° C. for 1 hour.

Li was reacted with O$_2$ for various times at various temperatures to form Li$_2$O layers on Li metal SEM images (see, for example, FIGS. 18A-18F) and XPS data (see, for example, FIGS. 19A-19B and FIG. 20) were obtained. The electrochemical behavior of these films was also evaluated using electrochemical impedance spectroscopy (See, for example, FIGS. 21A-21D).

Example 5

The following example describes the formation and characterization of passivation layers on alkali metals by reacting Li with N$_2$O and N$_2$.

Figure 22:
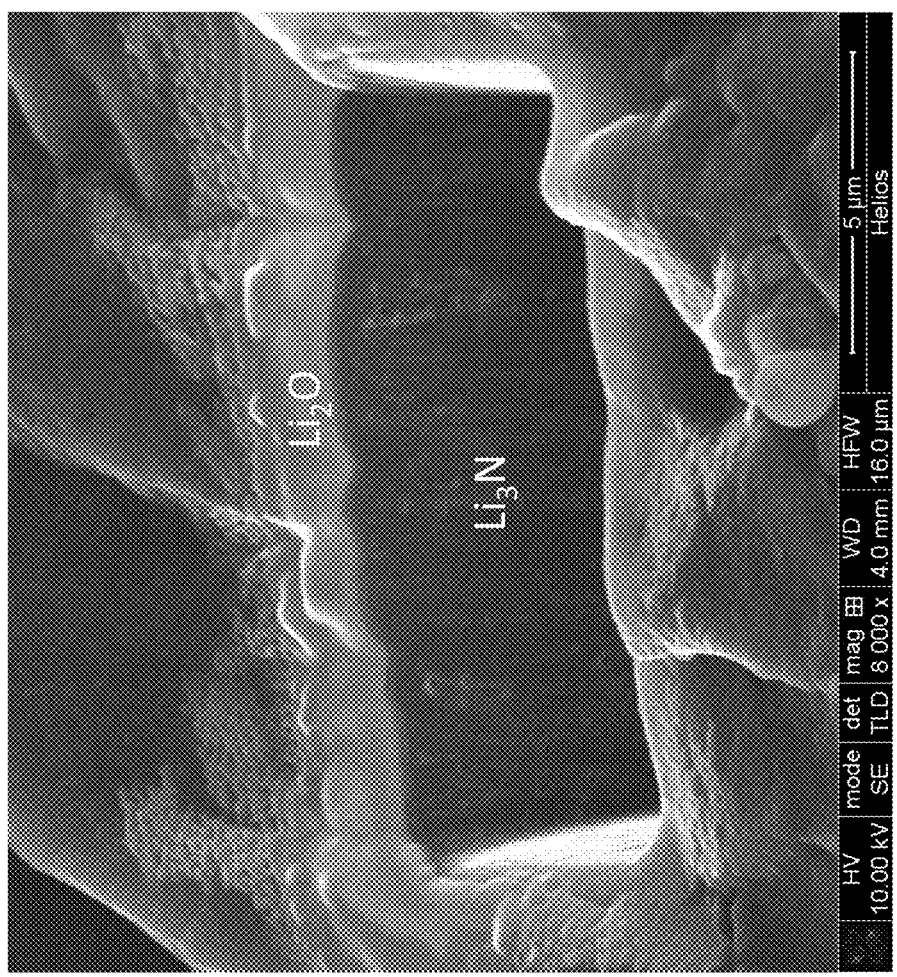
FIG. 22 shows, according to certain embodiments, a focused ion beam SEM image of Li reacted with $N_2O$ at 200° C. for 20 minutes and then with $N_2$ at 100° C. for 18 hours.
Figure 23:
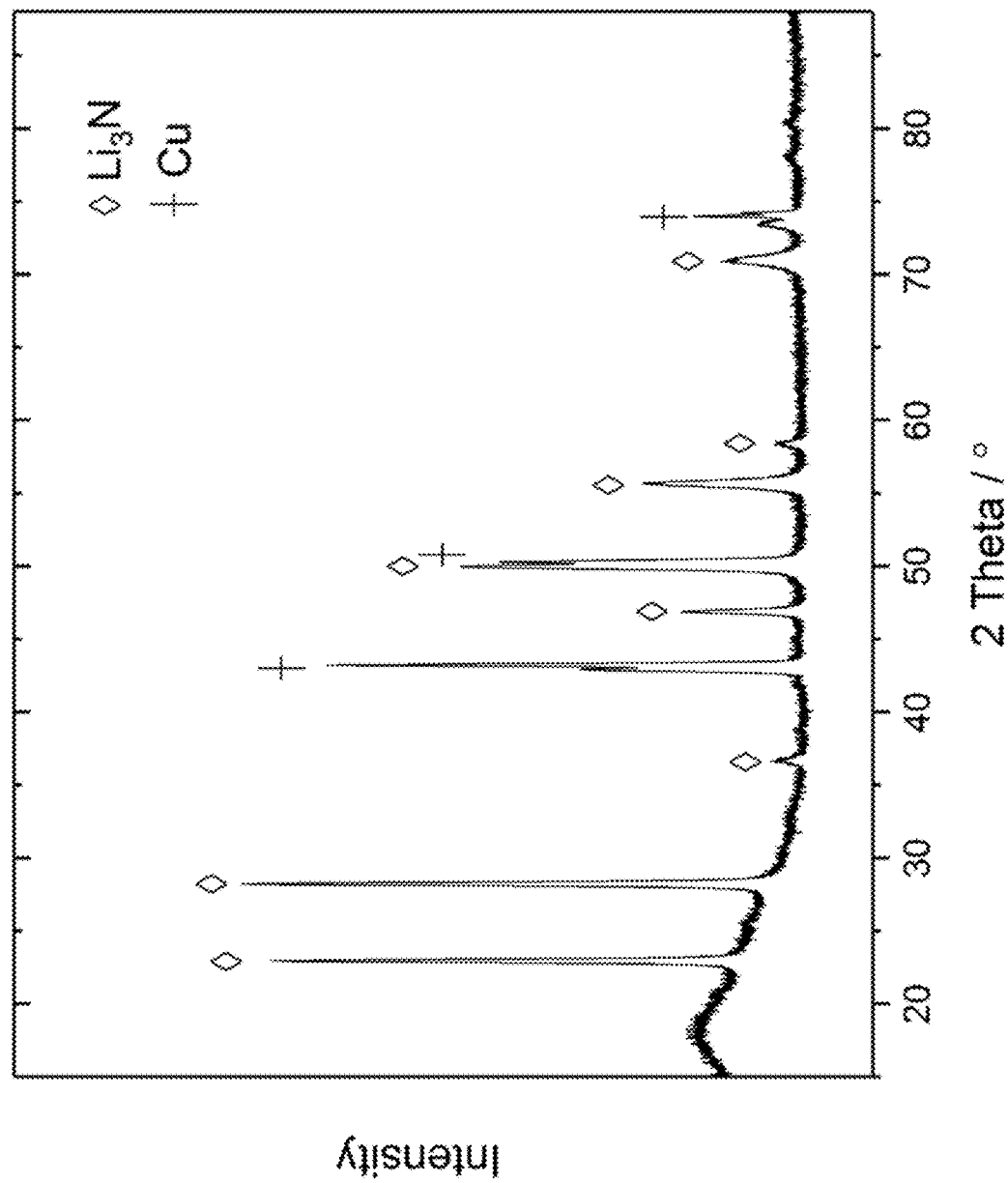
FIG. 23 shows, according to certain embodiments, a XRD image of Li reacted with $N_2O$ at 200° C. for 20 minutes and then with $N_2$ at 100° C. for 18 hours.

Li was reacted with multiple gases sequentially in order to form multiple passivation layers on the alkali metal layer. After reacting Li with N$_2$O and N$_2$, passivation layers comprising Li$_2$O and Li$_3$N were formed. See, for example, FIG. 22 and FIG. 23, depicting a SEM and XRD image, respectively, of Li reacted with N$_2$O at 200° C. for 20 minutes and then with N$_2$ at 100° C. for 18 hours.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An article, comprising:
an alkali metal layer; and
a passivation layer comprising an alkali metal salt, wherein a molar percentage of hydrogen at the surface of the passivation layer is less than or equal to about 1 mol. %, a thickness of the passivation layer is greater than or equal to about 0.05 micrometers, and the passivation layer is in direct contact with the alkali metal layer,
wherein the passivation layer is formed by reacting the alkali metal layer with a gas.

2. The article of claim 1, wherein a molar percentage of the alkali metal salt in the passivation layer is greater than or equal to about 85 mol. %.

3. The article of claim 1, wherein the alkali metal layer comprises Li.

4. The article of claim 1, wherein the alkali metal salt is an alkali metal fluoride.

5. The article of claim 4, wherein the alkali metal fluoride is LiF.

6. The article of claim 1, wherein the alkali metal salt is an alkali metal oxide.

7. The article of claim 6, wherein the alkali metal oxide is $Li_2O$.

8. The article of claim 1, wherein the article is an electrode.

9. A battery comprising the article of claim 1.

10. An article, comprising:
an alkali metal layer; and
a passivation layer comprising an alkali metal salt, wherein a molar percentage of carbon, hydrogen, and/or oxygen in the passivation layer is less than 6 mol. % at a depth of about 0.01 micrometers, a thickness of the passivation layer is greater than or equal to about 0.05 micrometers, and the passivation layer is directly contacting the alkali metal layer,
wherein the passivation layer is formed by reacting the alkali metal layer with a gas.

11. An article, comprising
an alkali metal layer; and
a passivation layer comprising an alkali metal oxide, wherein the passivation layer is in direct contact with the alkali metal layer and a molar percentage of hydrogen at the surface of the passivation layer is less than or equal to about 1 mol. %,
wherein the passivation layer is formed by reacting the alkali metal layer with a gas.

* * * * *